United States Patent
Song et al.

(10) Patent No.: US 12,085,693 B2
(45) Date of Patent: Sep. 10, 2024

(54) OPTICAL LENS GROUP

(71) Applicant: Zhejiang Sunny Optical Co., Ltd, Ningbo (CN)

(72) Inventors: Litong Song, Ningbo (CN); Lin Huang, Ningbo (CN)

(73) Assignee: ZHEJIANG SUNNY OPTICAL CO., LTD, Ningbo (CN)

( * ) Notice: Subject to any disclaimer, the term of this patent is extended or adjusted under 35 U.S.C. 154(b) by 1005 days.

(21) Appl. No.: 17/009,688

(22) Filed: Sep. 1, 2020

(65) Prior Publication Data

US 2020/0400923 A1     Dec. 24, 2020

Related U.S. Application Data

(63) Continuation of application No. PCT/CN2019/095612, filed on Jul. 11, 2019.

(30) Foreign Application Priority Data

Oct. 10, 2018   (CN) .......................... 201811179873.8

(51) Int. Cl.
   *G02B 13/18*   (2006.01)
   *G02B 9/62*    (2006.01)
   (Continued)

(52) U.S. Cl.
   CPC ........... *G02B 13/0045* (2013.01); *G02B 9/62* (2013.01); *G02B 27/0025* (2013.01)

(58) Field of Classification Search
   CPC . G02B 9/00; G02B 9/62; G02B 13/00; G02B 13/001; G02B 13/0015;
   (Continued)

(56) References Cited

U.S. PATENT DOCUMENTS 9,261,670  B2 *   2/2016   Lai .......................... G02B 9/10
10,131,278 B2 *  11/2018   Nagano .................. H04N 25/76
(Continued)

FOREIGN PATENT DOCUMENTS

CN   104570286 A    4/2015
CN   105204140     12/2015
(Continued)

OTHER PUBLICATIONS

International Search Report in Corresponding International Application No. PCT/CN2019/095612, mailed Sep. 27, 2019; 8 pgs.
(Continued)

*Primary Examiner* — Thong Q Nguyen
(74) *Attorney, Agent, or Firm* — HAUPTMAN HAM, LLP

(57) ABSTRACT

The present disclosure discloses an optical lens group including, sequentially from an object side to an image side along an optical axis, a first lens, a second lens, a third lens, a fourth lens, a fifth lens and a sixth lens. The first lens has negative refractive power; the second lens has refractive power, and an image-side surface thereof is a concave surface; the third lens has refractive power, and an image-side surface thereof is a convex surface; the fourth lens has positive refractive power, and an object-side surface thereof is a convex surface; the fifth lens has negative refractive power; and the sixth lens has refractive power. The third lens is made of glass, and a center thickness CT3 of the third lens along the optical axis and a center thickness CT4 of the fourth lens along the optical axis satisfy $1.5<CT3/CT4<2.5$.

16 Claims, 9 Drawing Sheets

(51) Int. Cl.
*G02B 13/00* (2006.01)
*G02B 27/00* (2006.01)

(58) Field of Classification Search
CPC .. G02B 13/0045; G02B 13/008; G02B 13/14; G02B 13/143; G02B 13/146; G02B 27/0025
USPC ........ 359/656–658, 713, 749–752, 754–756, 359/761
See application file for complete search history.

(56) References Cited

U.S. PATENT DOCUMENTS

| | | | |
|---|---|---|---|
| 10,539,760 B2* | 1/2020 | Chen | G02B 9/62 |
| 2018/0106987 A1 | 4/2018 | Lin et al. | |
| 2018/0172963 A1* | 6/2018 | Kim | G02B 13/18 |
| 2018/0335611 A1* | 11/2018 | Chen | G02B 9/62 |

FOREIGN PATENT DOCUMENTS

| | | |
|---|---|---|
| CN | 105204144 A | 12/2015 |
| CN | 205067849 U | 3/2016 |
| CN | 205157867 | 4/2016 |
| CN | 106569320 A | 4/2017 |
| CN | 107479170 A | 12/2017 |
| CN | 107783256 | 3/2018 |
| CN | 107783256 A | 3/2018 |
| CN | 108983401 A | 12/2018 |
| CN | 208833990 U | 5/2019 |
| JP | H05288986 A | 11/1993 |
| JP | 2014-44250 A | 3/2014 |
| JP | 2018031872 A | 3/2018 |
| WO | 2016125613 A1 | 8/2016 |

OTHER PUBLICATIONS

Office Action issued in corresponding Japanese Application No. 2020-541521, mailed Sep. 6, 2021, 7 pgs.

* cited by examiner

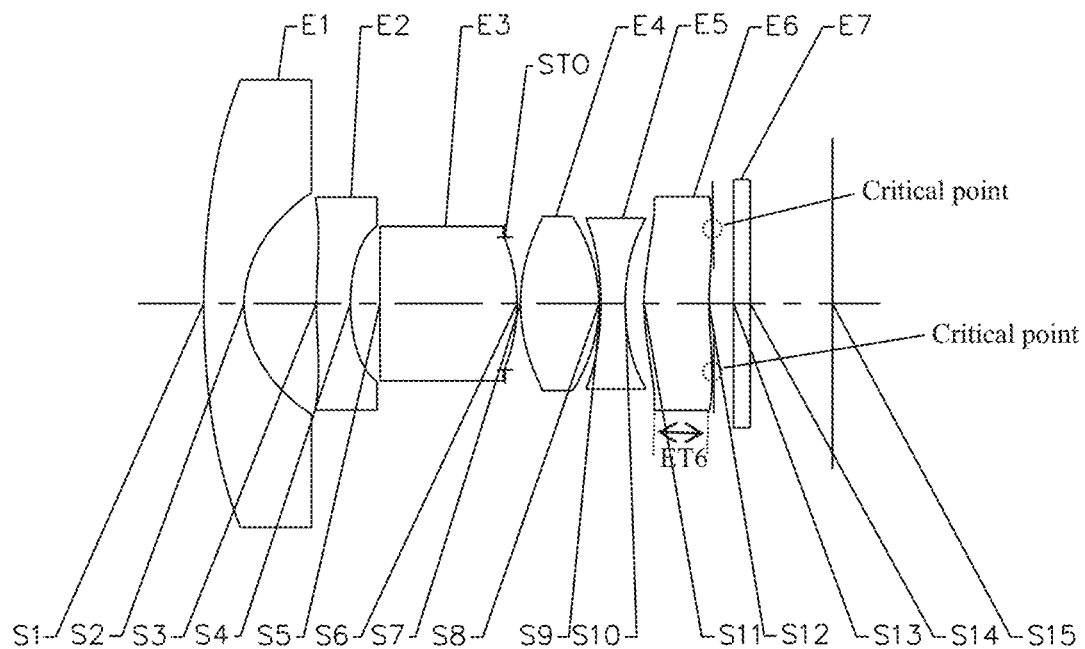
Fig. 9
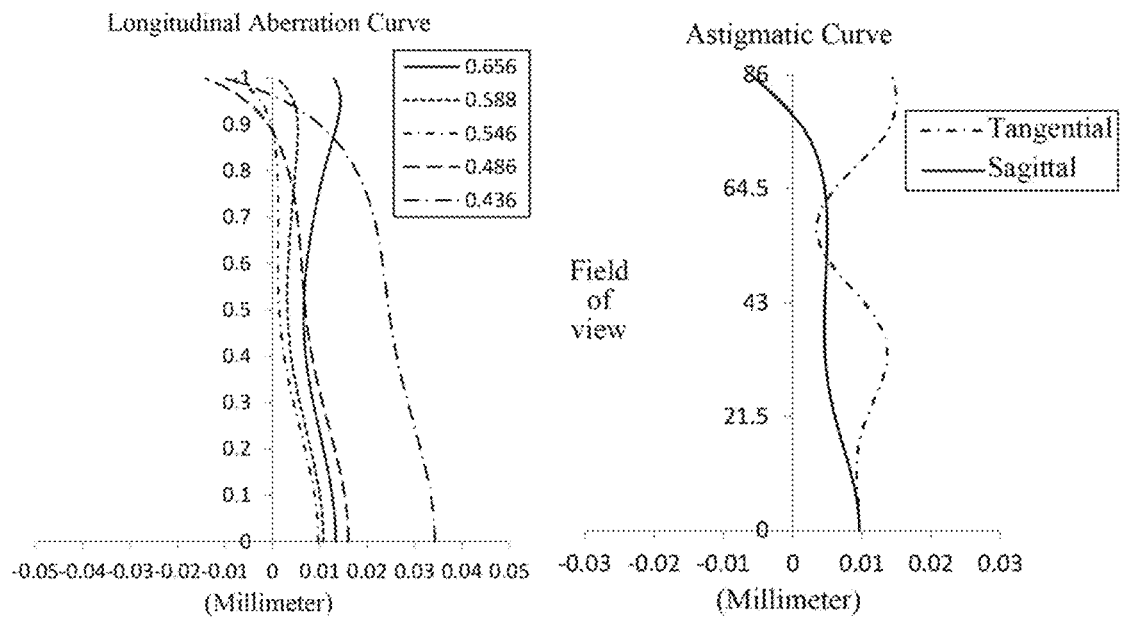
Fig. 10A
Fig. 10B

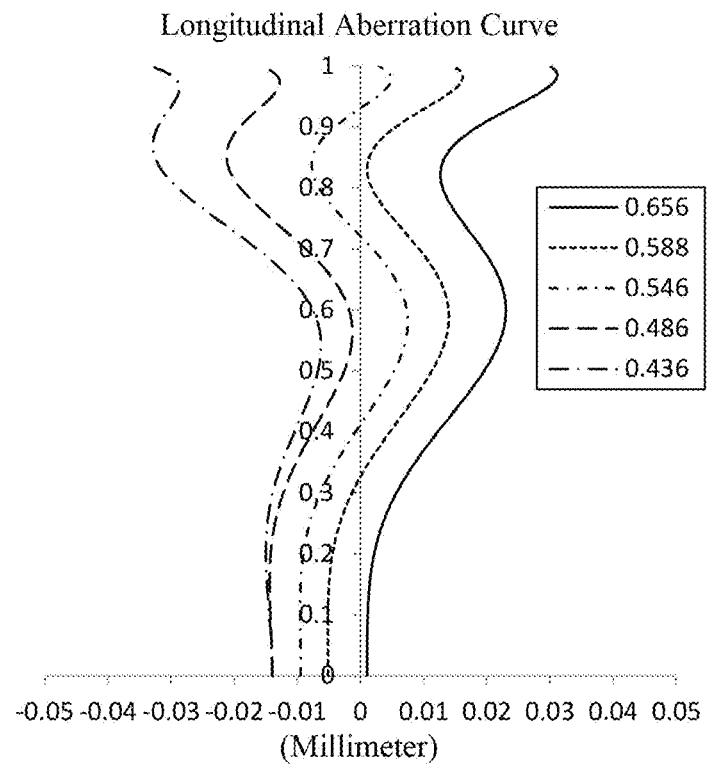
Fig. 12A
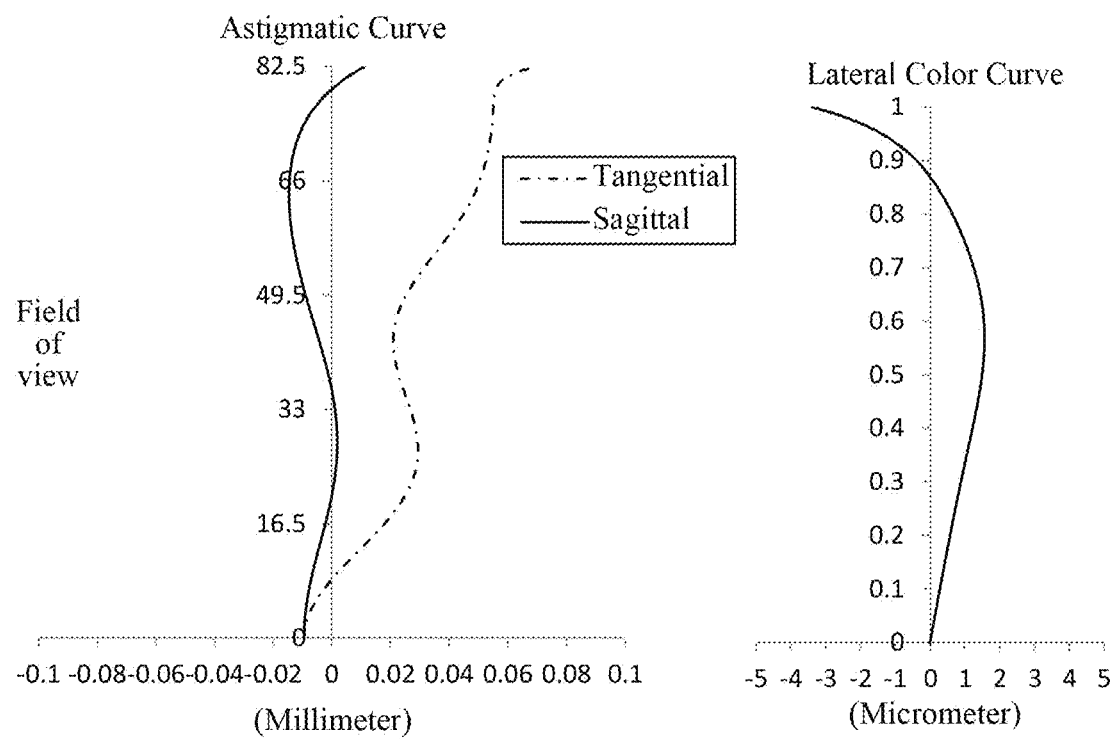
Fig. 12B
Fig. 12C

OPTICAL LENS GROUP

CROSS-REFERENCE TO RELATED APPLICATIONS

The present patent application is a continuation of International Application No. PCT/CN2019/095612, filed on Jul. 11, 2019, which claims priority to Chinese Patent Application No. 201811179873.8, filed before the China National Intellectual Property Administration (CNIPA) on Oct. 10, 2018. Both of the aforementioned patent applications are hereby incorporated by reference in their entireties.

TECHNICAL FIELD

The present disclosure relates to an optical lens group, and more specifically, relates to an optical lens group including six lenses.

BACKGROUND

The wide-angle lens assembly has the advantages of large field-of-view and long depth of field, so it is usually used to shoot a wide range of scenes. In recent years, with the development of emerging technologies, such as the virtual reality technology or the augmented reality technology (VR/AR), the wide-angle lens assembly has also been widely used in these fields. For example, the wide-angle lens assembly is being used in important functions, such as panoramic image capture and object positioning. In order to enable these functions to be better achieved, higher demands are put forward on the size, imaging quality, and field-of-view of the wide-angle lens assembly.

SUMMARY

The present disclosure provides an optical lens group that is applicable to portable electronic products and at least solves or partially addresses at least one of the above disadvantages of the prior art.

In one aspect, the present disclosure provides an optical lens group which includes, sequentially from an object side to an image side along an optical axis, a first lens, a second lens, a third lens, a fourth lens, a fifth lens and a sixth lens. The first lens may have negative refractive power; the second lens has positive refractive power or negative refractive power, and an image-side surface thereof may be a concave surface; the third lens has positive refractive power or negative refractive power, and an image-side surface thereof may be a convex surface; the fourth lens may have positive refractive power, and an object-side surface thereof may be a convex surface; the fifth lens may have negative refractive power; and the sixth lens has positive refractive power or negative refractive power. The third lens may be a lens made of glass.

In one embodiment, a center thickness CT3 of the third lens along the optical axis and a center thickness CT4 of the fourth lens along the optical axis may satisfy $1.5<CT3/CT4<2.5$.

In one embodiment, a refractive index N1 of the first lens and a refractive index N3 of the third lens may satisfy $N1/N3<0.9$.

In one embodiment, the third lens may have positive refractive power, and an effective focal length f1 of the first lens and an effective focal length f3 of the third lens may satisfy $-2<f1/f3\leq-1$.

In one embodiment, an effective focal length f1 of the first lens and a total effective focal length f of the optical lens group may satisfy $-4<f1/f<-1.8$.

In one embodiment, an effective focal length f1 of the first lens and an effective focal length f5 of the fifth lens may satisfy $1.3<f1/f5<2.1$.

In one embodiment, a radius of curvature R7 of the object-side surface of the fourth lens and a radius of curvature R8 of an image-side surface of the fourth lens may satisfy $-2<R7/R8<-1$.

In one embodiment, an image-side surface of the sixth lens may have an inflection point and a critical point. A vertical distance YC62 from the critical point on the image-side surface of the sixth lens to the optical axis and an effective half-aperture DT62 of the image-side surface of the sixth lens may satisfy $0.5<YC62/DT62<1$.

In one embodiment, an edge thickness ET6 of the sixth lens and a center thickness CT6 of the sixth lens along the optical axis may satisfy $0.6<ET6/CT6<1$.

In one embodiment, a distance SAG12 along the optical axis from an intersection of an image-side surface of the first lens and the optical axis to a vertex of a maximum effective half-aperture of the image-side surface of the first lens and a spaced interval TD between an object-side surface of the first lens and an image-side surface of the sixth lens along the optical axis may satisfy $1<SAG12*10/TD<2$.

In one embodiment, an effective half-aperture DT62 of an image-side surface of the sixth lens and half of a diagonal length ImgH of an effective pixel area on an imaging plane of the optical lens group may satisfy $0.5<DT62/ImgH<1$.

In one embodiment, a distance TTL along the optical axis from an object-side surface of the first lens to an imaging plane of the optical lens group, half of a diagonal length ImgH of an effective pixel area on the imaging plane of the optical lens group and half of a maximal field-of-view semiFOV of the optical lens group may satisfy $TTL/(ImgH*\tan(semiFOV/2))<6$.

In one embodiment, a spaced interval T34 between the third lens and the fourth lens along the optical axis, a spaced interval T45 between the fourth lens and the fifth lens along the optical axis and a spaced interval T56 between the fifth lens and the sixth lens along the optical axis may satisfy $(T34+T45)/T56<3$.

In one embodiment, an object-side surface of the second lens may be a convex surface.

The present disclosure employs six lenses, and the optical lens group has at least one beneficial effect, such as miniaturization, high image quality, and ultra-wide angle and the like, by rationally configuring the refractive power, the surface shape, the center thickness of each lens, and the on-axis spaced interval between the lenses and the like.

BRIEF DESCRIPTION OF THE DRAWINGS

Other features, objects, and advantages of the present disclosure will become more apparent from the following detailed description of the non-limiting embodiments with reference to the accompanying drawings. In the drawings:

FIG. 9 illustrates a schematic structural view of an optical lens group according to Example 5 of the present disclosure; and FIGS. 10A to 10C illustrate a longitudinal aberration curve, an astigmatic curve, and a lateral color curve of the optical lens group of the Example 5, respectively.

FIGS. 12A to 12C illustrate a longitudinal aberration curve, an astigmatic curve, and a lateral color curve of the optical lens group of the Example 6, respectively.

DETAILED DESCRIPTION OF EMBODIMENTS

Figure 1:
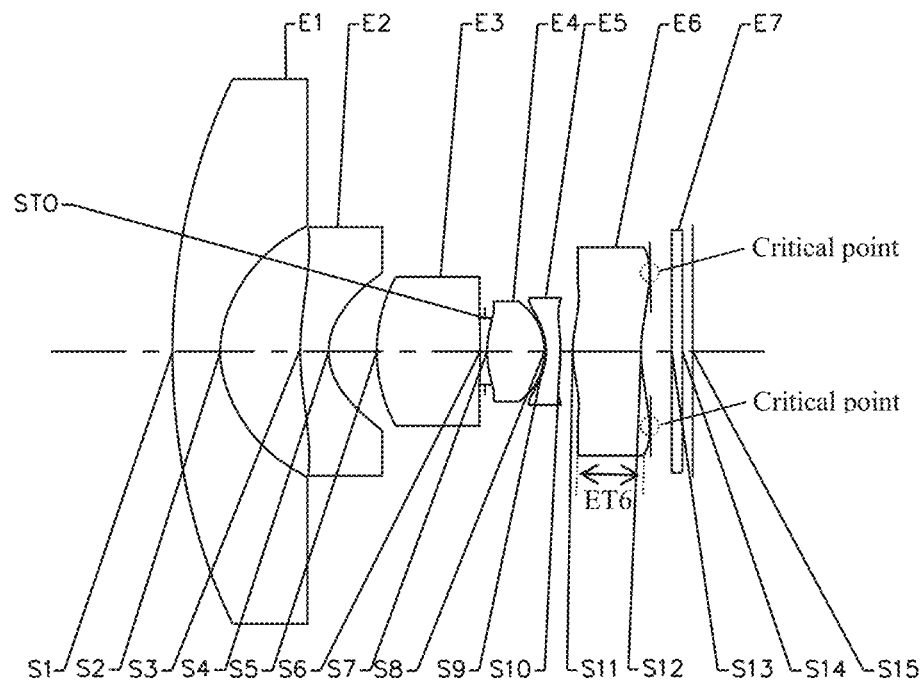
FIG. 1 illustrates a schematic structural view of an optical lens group according to Example 1 of the present disclosure.

For a better understanding of the present disclosure, various aspects of the present disclosure will be described in more detail with reference to the accompanying drawings. It should be understood that the detailed description is merely illustrative of the exemplary embodiments of the present disclosure and is not intended to limit the scope of the present disclosure in any way. Throughout the specification, the same reference numerals refer to the same elements. The expression "and/or" includes any and all combinations of one or more of the associated listed items.

It should be noted that in the present specification, the expressions such as first, second, third are used merely for distinguishing one feature from another, without indicating any limitation on the features. Thus, a first lens discussed below may also be referred to as a second lens or a third lens without departing from the teachings of the present disclosure.

In the accompanying drawings, the thickness, size and shape of the lens have been somewhat exaggerated for the convenience of explanation. In particular, shapes of spherical surfaces or aspheric surfaces shown in the accompanying drawings are shown by way of example. That is, shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

Herein, the paraxial area refers to an area near the optical axis. If a surface of a lens is a convex surface and the position of the convex is not defined, it indicates that the surface of the lens is convex at least in the paraxial region; and if a surface of a lens is a concave surface and the position of the concave is not defined, it indicates that the surface of the lens is concave at least in the paraxial region. In each lens, the surface closest to the object is referred to as an object-side surface of the lens, and the surface closest to the imaging plane is referred to as an image-side surface of the lens.

It should be further understood that the terms "comprising," "including," "having," "containing" and/or "contain," when used in the specification, specify the presence of stated features, elements and/or components, but do not exclude the presence or addition of one or more other features, elements, components and/or combinations thereof. In addition, expressions, such as "at least one of," when preceding a list of features, modify the entire list of features rather than an individual element in the list. Further, the use of "may," when describing embodiments of the present disclosure, refers to "one or more embodiments of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It will be further understood that terms, such as those defined in commonly used dictionaries, should be interpreted as having a meaning that is consistent with the meaning in the context of the relevant art and will not be interpreted in an idealized or overly formal sense, unless expressly so defined herein.

It should also be noted that, the examples in the present disclosure and the features in the examples may be combined with each other on a non-conflict basis. The present disclosure will be described in detail below with reference to the accompanying drawings and in combination with the examples.

The features, principles, and other aspects of the present disclosure are described in detail below.

An optical lens group according to an exemplary embodiment of the present disclosure may include, for example, six lenses having refractive power, which are a first lens, a second lens, a third lens, a fourth lens, a fifth lens and a sixth lens. The six lenses are arranged sequentially from an object side to an image side along an optical axis, and there may be a spaced interval between each two adjacent lenses.

In an exemplary embodiment, the first lens may have negative refractive power. The second lens has positive refractive power or negative refractive power, and an image-side surface thereof may be a concave surface. The third lens may have refractive power, and an image-side surface thereof may be a convex surface. The third lens may be a lens made of glass. The fourth lens may have positive refractive power, and an object-side surface thereof may be a convex surface. The fifth lens may have negative refractive power. The sixth lens has positive refractive power or negative refractive power. By reasonably configuring the refractive power of each lens of the lens group and the uneven shape of each lens surface, the spherical aberration and field curvature aberration of the system may be better compensated, so as to obtain higher image quality. Optionally, the third lens may be configured to have positive refractive power. Optionally, the object-side surface of the second lens may be configured to be a convex surface.

In an exemplary embodiment, an image-side surface of the first lens may be a concave surface.

In an exemplary embodiment, the second lens may have negative refractive power.

In an exemplary embodiment, an image-side surface of the fourth lens may be a convex surface.

In an exemplary embodiment, an object-side surface of the fifth lens may be a concave surface.

In an exemplary embodiment, the sixth lens may have positive refractive power, an object-side surface thereof may be a convex surface, and an image-side surface thereof may be a concave surface.

In an exemplary embodiment, the optical lens group according to the present disclosure may satisfy: TTL/(ImgH*tan(semiFOV/2))<6, where TTL is a distance along the optical axis from an object-side surface of the first lens to an imaging plane of the optical lens group, ImgH is half of a diagonal length of an effective pixel area on the imaging plane of the optical lens group, and semiFOV is half of a maximal field-of-view of the optical lens group. More specifically, TTL, ImgH and semiFOV may further satisfy: $3.5<TTL/(ImgH*\tan(semiFOV/2))<6.0$, for example, $4.04 \leq TTL/(ImgH*\tan(semiFOV/2)) \leq 5.02$. Satisfying the conditional expression $TTL/(ImgH*\tan(semiFOV/2))<6$ may make the lens assembly have the characteristics of a large field-of-view and a shorter total optical length, which may better meet the requirements of wide-angle and small size of the lens assembly.

In an exemplary embodiment, the optical lens group according to the present disclosure may satisfy: $N1/N3<0.9$, where N1 is a refractive index of the first lens, and N3 is a refractive index of the third lens. More specifically, N1 and N3 may further satisfy: $0.7<N1/N3<0.9$, for example, $0.86 \leq N1/N3 \leq 0.89$. By satisfying the conditional expression $N1/N3<0.9$, the vertical and axial chromatic aberrations of the lens assembly may be better eliminated, thereby greatly reducing the risk of purple fringing when the lens assembly is used.

In an exemplary embodiment, the optical lens group according to the present disclosure may satisfy: $(T34+T45)/T56<3$, where T34 is a spaced interval between the third lens and the fourth lens along the optical axis, T45 is a spaced interval between the fourth lens and the fifth lens along the optical axis, and T56 is a spaced interval between the fifth lens and the sixth lens along the optical axis. More specifically, T34, T45 and T56 may further satisfy: $0.29 \leq (T34+T45)/T56 \leq 2.73$. Satisfy the conditional expression $(T34+T45)/T56<3$ may achieve high image quality while obtaining the small size of the lens assembly.

In an exemplary embodiment, the optical lens group according to the present disclosure may satisfy: $1.5<CT3/CT4<2.5$, where CT3 is a center thickness of the third lens along the optical axis, and CT4 is a center thickness of the fourth lens along the optical axis. More specifically, CT3 and CT4 may further satisfy: $1.73 \leq CT3/CT4 \leq 2.23$. Satisfy the conditional expression $1.5<CT3/CT4<2.5$ may effectively eliminate field curvature and ensure the lens assembly has better processability.

In an exemplary embodiment, the optical lens group according to the present disclosure may satisfy: $-2<f1/f3 \leq -1$, where f1 is an effective focal length of the first lens, and f3 is an effective focal length of the third lens. More specifically, f1 and f3 may further satisfy: $-1.80 \leq f1/f3 \leq -1.00$. Satisfying the conditional formula $-1.5<f1/f3 \leq -1$ is beneficial to correcting the spherical aberration of the system and ensuring image quality.

In an exemplary embodiment, the optical lens group according to the present disclosure may satisfy: $-4<f1/f<-1.8$, where f1 is an effective focal length of the first lens, and f is a total effective focal length of the optical lens group. More specifically, f1 and f may further satisfy: $-3.81 \leq f1/f \leq -1.91$. By rationally configuring the refractive power of the first lens, the spherical aberration of the system may be effectively corrected.

In an exemplary embodiment, the optical lens group according to the present disclosure may satisfy: $1.3<f1/f5<2.1$, where f1 is an effective focal length of the first lens, and f5 is an effective focal length of the fifth lens. More specifically, f1 and f5 may further satisfy: $1.33<f1/f5<2.06$. By properly configuring the ratio of the refractive power of the first lens with respect to the refractive power of the fifth lens, the axial chromatic aberration may be effectively corrected.

In an exemplary embodiment, the optical lens group according to the present disclosure may satisfy: $-2<R7/R8<-1$, where R7 is a radius of curvature of the object-side surface of the fourth lens, and R8 is a radius of curvature of an image-side surface of the fourth lens. More specifically, R7 and R8 may further satisfy: $-1.96 \leq R7/R8 \leq -1.12$. By satisfying the conditional expression $-2<R7/R8<-1$, the astigmatic aberration may be effectively corrected, thereby obtaining high-quality imaging effects.

In an exemplary embodiment, the optical lens group according to the present disclosure may satisfy: $0.6<ET6/CT6<1$, where ET6 is an edge thickness of the sixth lens, and CT6 is a center thickness of the sixth lens along the optical axis. More specifically, ET6 and CT6 may further satisfy: $0.76 \leq ET6/CT6 \leq 0.97$. Satisfying the conditional expression $0.6<ET6/CT6<1$ makes the lens assembly have higher imaging quality, effectively reduces the size of the optical lens group, and may make the system have the process characteristics of easy processing.

In an exemplary embodiment, an image-side surface of the sixth lens may have at least one inflection point and at least one critical point, and the optical lens group according to the present disclosure may satisfy: $0.5<YC62/DT62<1$, where YC62 is a vertical distance from the critical point of the image-side surface of the sixth lens to the optical axis, and DT62 is an effective half-aperture of the image-side surface of the sixth lens. The critical point of the image-side surface of the sixth lens refers to the point, except for the intersection point with the optical axis, on the image-side surface of the sixth lens that is tangent to the tangent plane perpendicular to the optical axis. More specifically, YC62 and DT62 may further satisfy: $0.66 \leq YC62/DT62 \leq 0.85$. Satisfying the conditional expression $0.5<YC62/DT62<1$ is beneficial to correcting the field curvature aberration at the off-axis field, thereby obtaining higher imaging quality.

In an exemplary embodiment, the optical lens group according to the present disclosure may satisfy: $1<SAG12*10/TD<2$, where SAG12 is a distance along the optical axis from an intersection of an image-side surface of the first lens and the optical axis to a vertex of a maximum effective half-aperture of the image-side surface of the first lens, and TD is a spaced interval between an object-side surface of the first lens and an image-side surface of the sixth lens along the optical axis. More specifically, SAG12 and TD may further satisfy: $1.09 \leq SAG12*10/TD \leq 1.86$. Satisfying the conditional expression $1<SAG12*10/TD<2$ may ensure that the lens assembly has a lower tolerance sensitivity and a better processability.

In an exemplary embodiment, the optical lens group according to the present disclosure may satisfy: $0.5<DT62/ImgH<1$, where DT62 is an effective half-aperture of an image-side surface of the sixth lens, and ImgH is half of a diagonal length of an effective pixel area on an imaging plane of the optical lens group. More specifically, DT62 and ImgH may further satisfy: $0.58 \leq DT62/ImgH \leq 0.82$. Satisfying the conditional expression $0.5<DT62/ImgH<1$ may effectively compress the outer diameter of the rear end of the lens assembly, thereby ensuring the processability of the lens assembly.

In an exemplary embodiment, the above optical lens group may further include at least one stop to improve the image quality of the lens group. The stop may be disposed between the third lens and the fourth lens. Optionally, the above optical lens group may further include an optical filter for correcting the color deviation and/or a protective glass for protecting the photosensitive element located on an imaging plane.

The optical lens group according to the above embodiments of the present disclosure may employ a plurality of lenses, such as six lenses as described above. By properly configuring the refractive power of each lens, the surface shape, the center thickness of each lens, and spaced intervals along the optical axis between the lenses, the size and the sensitivity of the lens group may be effectively reduced, and the workability of the lens group may be improved, such that the optical lens group is more advantageous for production processing and may be applied to portable electronic products. The optical lens group configured as described above may also have beneficial effects such as miniaturization, high image quality, and ultra-wide angle.

In the embodiments of the present disclosure, the surfaces of the lenses are mostly aspheric surface. The aspheric lens is characterized by a continuous change in curvature from the center of the lens to the periphery of the lens. Unlike a spherical lens having a constant curvature from the center of the lens to the periphery of the lens, the aspheric lens has a better curvature radius characteristic, and has the advantages of improving distortion aberration and improving astigmatic aberration. With aspheric lens, the aberrations that occur during imaging may be eliminated as much as possible, and thus improving the image quality. Optionally, at least one of the object-side surface and the image-side surface of each of the first lens, the second lens, the fourth lens, the fifth lens and the sixth lens is aspheric. Further, the object-side surface and the image-side surface of each of the first lens, the second lens, the fourth lens, the fifth lens and the sixth lens are aspheric.

However, it will be understood by those skilled in the art that the number of lenses constituting the optical lens group may be varied to achieve the various results and advantages described in this specification without departing from the technical solution claimed by the present disclosure. For example, although the embodiment is described by taking six lenses as an example, the optical lens group is not limited to include six lenses. The optical lens group may also include other numbers of lenses if desired. Some specific examples of an optical lens group applicable to the above embodiment will be further described below with reference to the accompanying drawings.

Example 1

An optical lens group according to example 1 of the present disclosure is described below with reference to FIG. 1 to FIG. 2C. FIG. 1 shows a schematic structural view of the optical lens group according to example 1 of the present disclosure.

As shown in FIG. 1, the optical lens group according to an exemplary embodiment of the present disclosure includes a first lens E1, a second lens E2, a third lens E3, a stop STO, a fourth lens E4, a fifth lens E5, a sixth lens E6, an optical filter E7 and an imaging plane S15, which are sequentially arranged from an object side to an image side along an optical axis.

The first lens E1 has negative refractive power, an object-side surface S1 thereof is a convex surface, and an image-side surface S2 thereof is a concave surface. The second lens E2 has negative refractive power, an object-side surface S3 thereof is a convex surface, and an image-side surface S4 thereof is a concave surface. The third lens E3 has positive refractive power, an object-side surface S5 thereof is a convex surface, an image-side surface S6 thereof is a convex surface, and the third lens E3 may be made of glass. The fourth lens E4 has positive refractive power, an object-side surface S7 thereof is a convex surface, and an image-side surface S8 thereof is a convex surface. The fifth lens E5 has negative refractive power, an object-side surface S9 thereof is a concave surface, and an image-side surface S10 thereof is a convex surface. The sixth lens E6 has positive refractive power, an object-side surface S11 thereof is a convex surface, an image-side surface S12 thereof is a concave surface, and the image-side surface S12 of the sixth lens E6 has an inflection point and a critical point. The optical filter E7 has an object-side surface S13 and an image-side surface S14. Light from an object sequentially passes through the respective surfaces S1 to S14 and is finally imaged on the imaging plane S15.

Table 1 shows surface type, radius of curvature, thickness, material and conic coefficient of each lens of the optical lens group in example 1, wherein the units for the radius of curvature and the thickness are millimeter (mm).

TABLE 1

| Surface number | Surface type | Radius of curvature | Thickness | Material Refractive index | Material Abbe number | Conic coefficient |
|---|---|---|---|---|---|---|
| OBJ | Spherical | Infinite | Infinite | | | |
| S1 | Aspheric | 12.8157 | 0.9459 | 1.55 | 56.1 | −0.3620 |
| S2 | Aspheric | 2.0082 | 1.5817 | | | −1.3024 |
| S3 | Aspheric | 4.7446 | 0.5640 | 1.55 | 56.1 | −30.9623 |
| S4 | Aspheric | 1.2215 | 0.9509 | | | −0.9340 |
| S5 | Spherical | 3.0687 | 2.0439 | 1.76 | 27.5 | |
| S6 | Spherical | −23.8792 | 0.0960 | | | |
| STO | Spherical | Infinite | 0.0440 | | | |
| S7 | Aspheric | 1.9841 | 1.1346 | 1.55 | 56.1 | −0.7128 |
| S8 | Aspheric | −1.2647 | 0.0323 | | | −0.1817 |
| S9 | Aspheric | −1.1764 | 0.2800 | 1.67 | 20.37 | −1.0307 |
| S10 | Aspheric | −6.7138 | 0.2441 | | | −33.3548 |
| S11 | Aspheric | 1.7166 | 1.3555 | 1.55 | 56.1 | −14.9650 |
| S12 | Aspheric | 3.3966 | 0.6064 | | | −1.9976 |
| S13 | Spherical | Infinite | 0.2100 | 1.52 | 64.2 | |
| S14 | Spherical | Infinite | 0.2034 | | | |
| S15 | Spherical | Infinite | | | | |

As can be seen from Table 1, the object-side surface S5 and the image-side surface S6 of the third lens E3 are spherical. The object-side surface and the image-side surface of any one of the first lens E1, the second lens E2, the fourth lens E4, the fifth lens E5 and the sixth lens E6 are aspheric. In this example, the surface shape x of each aspheric lens may be defined by using, but not limited to, the following aspheric formula:

$$x = \frac{ch^2}{1 + \sqrt{1-(k+1)c^2h^2}} + \sum A_i H^i \quad (1)$$

Where, x is the sag—the axis-component of the displacement of the surface from the aspheric vertex, when the surface is at height h from the optical axis; c is a paraxial curvature of the aspheric surface, c=1/R (that is, the paraxial curvature c is reciprocal of the radius of curvature R in the above Table 1); k is a conic coefficient (given in the above Table 1); Ai is a correction coefficient for the i-th order of the aspheric surface. Table 2 below shows high-order coefficients A4, A6, A8, A10, A12, A14 and A16 applicable to each aspheric surface S1 to S4 and S7 to S12 in example 1.

TABLE 2

| Surface number | A4 | A6 | A8 | A10 | A12 | A14 | A16 |
|---|---|---|---|---|---|---|---|
| S1 | −4.7132E−04 | 5.7565E−05 | −2.3954E−06 | 3.4969E−08 | 0.0000E+00 | 0.0000E+00 | 0.0000E+00 |
| S2 | −9.6427E−03 | 6.3834E−03 | −1.8507E−03 | 3.8427E−04 | −2.8224E−05 | 0.0000E+00 | 0.0000E+00 |
| S3 | 3.7373E−04 | −1.8848E−03 | 2.3176E−04 | −4.4450E−06 | −6.4217E−07 | 0.0000E+00 | 0.0000E+00 |
| S4 | 2.8608E−02 | −7.1520E−03 | −6.0982E−03 | 3.3393E−03 | −5.0755E−04 | 0.0000E+00 | 0.0000E+00 |
| S7 | 1.0780E−02 | −3.5450E−01 | 2.2008E+00 | −8.3491E+00 | 1.7329E+01 | −1.9534E+01 | 9.0187E+00 |
| S8 | 1.3090E−01 | −1.0426E+00 | 3.3232E+00 | −6.5502E+00 | 7.7194E+00 | −4.9954E+00 | 1.3573E+00 |
| S9 | 9.6211E−02 | −2.3773E−01 | 8.2469E−01 | −1.5036E+00 | 1.0692E+00 | 9.2346E−03 | −1.7836E−01 |
| S10 | −2.6074E−01 | 1.0203E+00 | −1.8118E+00 | 2.3357E+00 | −2.0455E+00 | 1.0545E+00 | −2.3077E−01 |
| S11 | −7.1404E−02 | −6.0906E−03 | 9.8057E−02 | −1.3846E−01 | 9.6649E−02 | −3.6121E−02 | 5.6026E−03 |
| S12 | −2.9672E−04 | −5.8844E−02 | 4.4653E−02 | −1.7320E−02 | 3.8160E−03 | −4.6203E−04 | 2.3667E−05 |

Table 3 shows a total optical length TTL of the optical lens group (i.e., the distance along the optical axis from the object-side surface S1 of the first lens E1 to the imaging plane S15), half of a diagonal length ImgH of an effective pixel area on the imaging plane S15, half of a maximal field-of-view semiFOV, a total effective focal length f of the optical lens group, and effective focal lengths f1 to f6 of respective lens in example 1.

TABLE 3

| | |
|---|---|
| TTL (mm) | 10.29 |
| ImgH (mm) | 2.51 |
| semiFOV (°) | 90.2 |
| f (mm) | 1.18 |
| f1 (mm) | −4.50 |
| f2 (mm) | −3.19 |
| f3 (mm) | 3.70 |
| f4 (mm) | 1.61 |
| f5 (mm) | −2.18 |
| f6 (mm) | 4.95 |

Figure 2A:
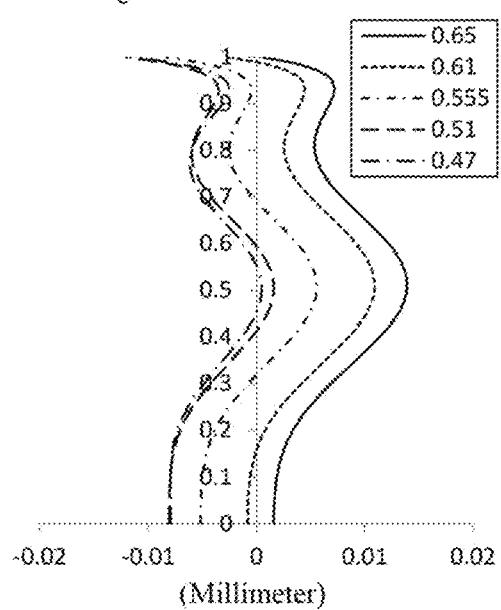
FIGS. 2A to 2C illustrate a longitudinal aberration curve, an astigmatic curve, and a lateral color curve of the optical lens group of the Example 1, respectively.
Figure 2B:
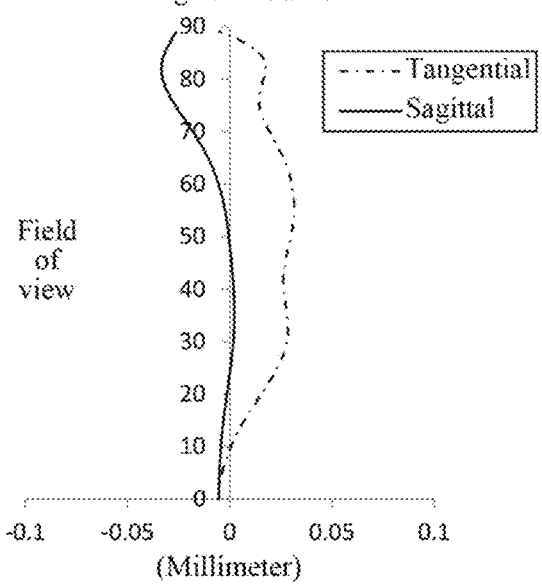
Figure 2C:
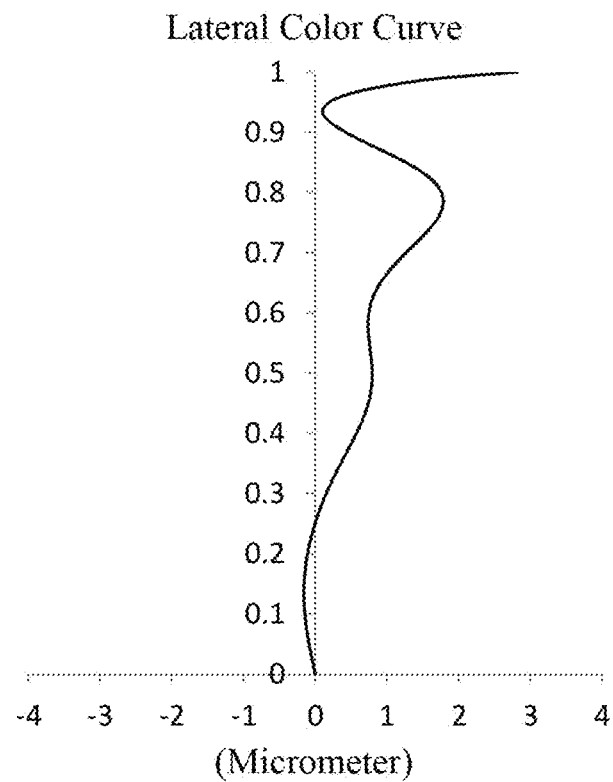

FIG. 2A illustrates a longitudinal aberration curve of the optical lens group according to example 1, representing deviations of focal points converged by light of different wavelengths after passing through the lens group. FIG. 2B illustrates an astigmatic curve of the optical lens group according to example 1, representing a curvature of a tangential plane and a curvature of a sagittal plane. FIG. 2C illustrates a lateral color curve of the optical lens group according to example 1, representing deviations of different image heights on an imaging plane after light passes through the lens group. It can be seen from FIG. 2A to FIG. 2C that the optical lens group provided in example 1 may achieve good image quality.

Example 2

Figure 3:
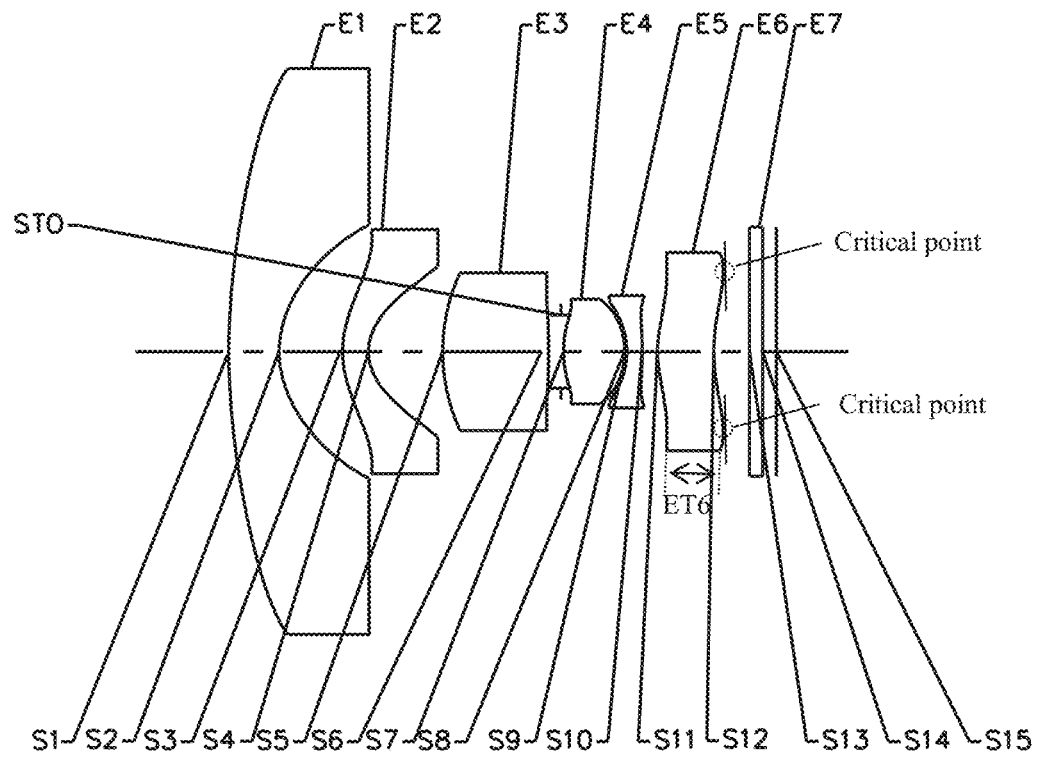
FIG. 3 illustrates a schematic structural view of an optical lens group according to Example 2 of the present disclosure.

An optical lens group according to example 2 of the present disclosure is described below with reference to FIG. 3 to FIG. 4C. In this example and the following examples, for the purpose of brevity, the description of parts similar to those in example 1 will be omitted. FIG. 3 shows a schematic structural view of the optical lens group according to example 2 of the present disclosure.

As shown in FIG. 3, the optical lens group according to an exemplary embodiment of the present disclosure includes a first lens E1, a second lens E2, a third lens E3, a stop STO, a fourth lens E4, a fifth lens E5, a sixth lens E6, an optical filter E7 and an imaging plane S15, which are sequentially arranged from an object side to an image side along an optical axis.

The first lens E1 has negative refractive power, an object-side surface S1 thereof is a convex surface, and an image-side surface S2 thereof is a concave surface. The second lens E2 has negative refractive power, an object-side surface S3 thereof is a convex surface, and an image-side surface S4 thereof is a concave surface. The third lens E3 has positive refractive power, an object-side surface S5 thereof is a convex surface, an image-side surface S6 thereof is a convex surface, and the third lens E3 may be made of glass. The fourth lens E4 has positive refractive power, an object-side surface S7 thereof is a convex surface, and an image-side surface S8 thereof is a convex surface. The fifth lens E5 has negative refractive power, an object-side surface S9 thereof is a concave surface, and an image-side surface S10 thereof is a convex surface. The sixth lens E6 has positive refractive power, an object-side surface S11 thereof is a convex surface, an image-side surface S12 thereof is a concave surface, and the image-side surface S12 of the sixth lens E6 has an inflection point and a critical point. The optical filter E7 has an object-side surface S13 and an image-side surface S14. Light from an object sequentially passes through the respective surfaces S1 to S14 and is finally imaged on the imaging plane S15.

Table 4 shows surface type, radius of curvature, thickness, material and conic coefficient of each lens of the optical lens group in example 2, wherein the units for the radius of curvature and the thickness are millimeter (mm).

TABLE 4

| Surface number | Surface type | Radius of curvature | Thickness | Material Refractive index | Abbe number | Conic coefficient |
|---|---|---|---|---|---|---|
| OBJ | Spherical | Infinite | Infinite | | | |
| S1 | Aspheric | 10.7713 | 0.8000 | 1.55 | 56.1 | −5.6282 |
| S2 | Aspheric | 1.5624 | 1.0132 | | | −1.2338 |
| S3 | Aspheric | 1.5740 | 0.4128 | 1.55 | 56.1 | −3.3436 |
| S4 | Aspheric | 0.7852 | 1.1838 | | | −1.0222 |
| S5 | Spherical | 3.0371 | 1.6887 | 1.76 | 27.5 | |
| S6 | Spherical | −10.6446 | 0.1955 | | | |
| STO | Spherical | Infinite | 0.0429 | | | |
| S7 | Aspheric | 1.7775 | 0.9740 | 1.55 | 56.1 | 0.2148 |
| S8 | Aspheric | −1.2198 | 0.0357 | | | −0.1089 |
| S9 | Aspheric | −1.1898 | 0.2440 | 1.67 | 20.4 | −0.5184 |
| S10 | Aspheric | −13.2519 | 0.2415 | | | 98.9981 |
| S11 | Aspheric | 1.4834 | 0.9000 | 1.55 | 56.1 | −12.8856 |
| S12 | Aspheric | 2.8008 | 0.5695 | | | −6.3097 |
| S13 | Spherical | Infinite | 0.2100 | 1.52 | 64.2 | |
| S14 | Spherical | Infinite | 0.2190 | | | |
| S15 | Spherical | Infinite | | | | |

As can be seen from Table 4, in example 2, the object-side surface S5 and the image-side surface S6 of the third lens E3 are spherical. The object-side surface and the image-side surface of any one of the first lens E1, the second lens E2, the fourth lens E4, the fifth lens E5 and the sixth lens E6 are aspheric. Table 5 shows high-order coefficients applicable to each aspheric surface in example 2, wherein the surface shape of each aspheric surface may be defined by the formula (1) given in the above example 1.

TABLE 5

| Surface number | A4 | A6 | A8 | A10 | A12 | A14 | A16 |
|---|---|---|---|---|---|---|---|
| S1 | −9.5464E−04 | 1.2036E−04 | −5.9578E−06 | 1.4618E−07 | 0.0000E+00 | 0.0000E+00 | 0.0000E+00 |
| S2 | −1.7092E−02 | 1.4028E−02 | −4.5123E−03 | 1.2215E−03 | −1.2856E−04 | 0.0000E+00 | 0.0000E+00 |
| S3 | −8.8954E−03 | −5.1780E−03 | 5.3358E−04 | 3.9470E−06 | −2.9251E−06 | 0.0000E+00 | 0.0000E+00 |
| S4 | 2.8228E−02 | −1.3811E−02 | −1.9271E−02 | 1.1659E−02 | −2.3119E−03 | 0.0000E+00 | 0.0000E+00 |
| S7 | 1.0781E−02 | −5.8171E−01 | 4.8939E+00 | −2.4395E+01 | 6.5258E+01 | −9.2607E+01 | 5.2638E+01 |
| S8 | 2.0147E−01 | −1.9495E+00 | 6.9880E+00 | −1.6673E+01 | 2.4903E+01 | −2.0941E+01 | 7.4642E+00 |
| S9 | 7.9907E−02 | −2.5578E−02 | −1.0064E+00 | 5.0618E+00 | −1.2495E+01 | 1.4895E+01 | −6.4276E+00 |
| S10 | −3.6367E−01 | 1.9602E+00 | −4.7645E+00 | 8.3885E+00 | −9.8326E+00 | 6.6962E+00 | −1.9384E+00 |
| S11 | −9.3858E−02 | 7.5800E−02 | −7.8040E−02 | 1.0335E−01 | −9.5866E−02 | 4.3600E−02 | −7.2912E−03 |
| S12 | 1.7655E−03 | −9.1211E−02 | 1.0360E−01 | −6.3654E−02 | 2.2441E−02 | −4.4834E−03 | 3.9712E−04 |

Table 6 shows a total optical length TTL of the optical lens group, half of a diagonal length ImgH of an effective pixel area on the imaging plane S15, half of a maximal field-of-view semiFOV, a total effective focal length f of the optical lens group, and effective focal lengths f1 to f6 of respective lens in example 2.

TABLE 6

| | |
|---|---|
| TTL (mm) | 8.73 |
| ImgH (mm) | 1.98 |
| semiFOV (°) | 82.5 |
| f (mm) | 1.03 |
| f1 (mm) | −3.45 |
| f2 (mm) | −3.52 |
| f3 (mm) | 3.28 |
| f4 (mm) | 1.50 |
| f5 (mm) | −1.98 |
| f6 (mm) | 4.65 |

Figure 4A:
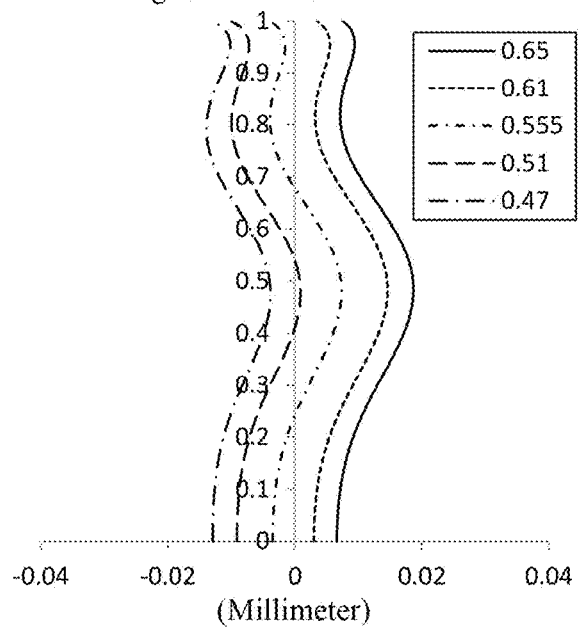
FIGS. 4A to 4C illustrate a longitudinal aberration curve, an astigmatic curve, and a lateral color curve of the optical lens group of the Example 2, respectively.
Figure 4B:
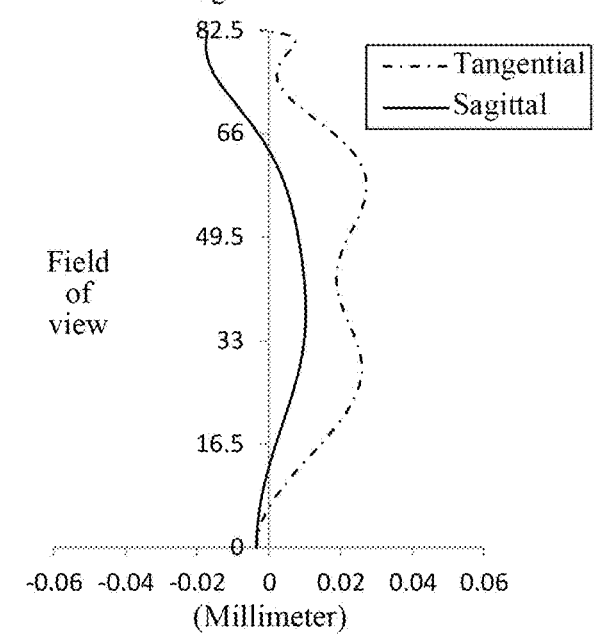
Figure 4C:
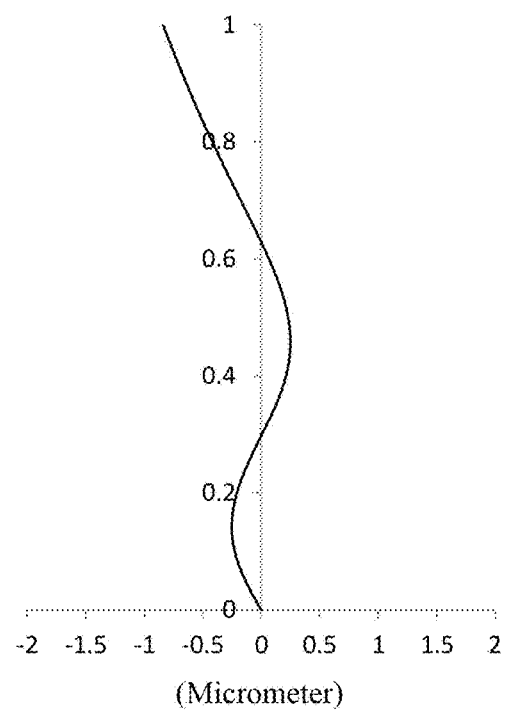

FIG. 4A illustrates a longitudinal aberration curve of the optical lens group according to example 2, representing deviations of focal points converged by light of different wavelengths after passing through the lens group. FIG. 4B illustrates an astigmatic curve of the optical lens group according to example 2, representing a curvature of a tangential plane and a curvature of a sagittal plane. FIG. 4C illustrates a lateral color curve of the optical lens group according to example 2, representing deviations of different image heights on an imaging plane after light passes through the lens group. It can be seen from FIG. 4A to FIG. 4C that the optical lens group provided in example 2 may achieve good image quality.

Example 3

Figure 5:
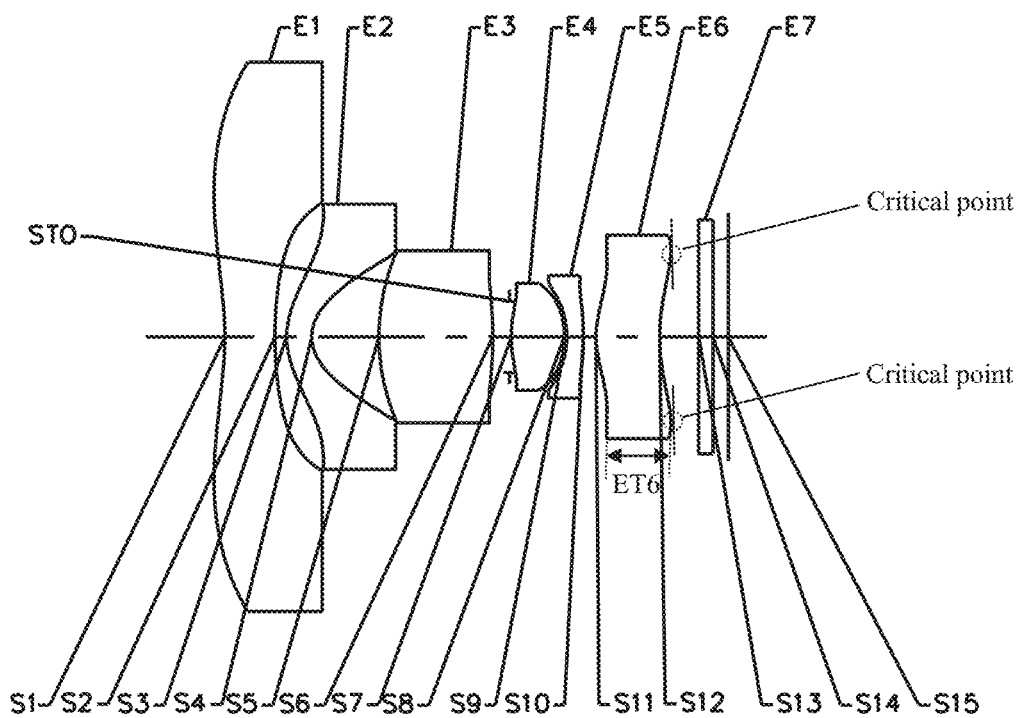
FIG. 5 illustrates a schematic structural view of an optical lens group according to Example 3 of the present disclosure.

An optical lens group according to example 3 of the present disclosure is described below with reference to FIG. 5 to FIG. 6C. FIG. 5 shows a schematic structural view of the optical lens group according to example 3 of the present disclosure.

As shown in FIG. 5, the optical lens group according to an exemplary embodiment of the present disclosure includes a first lens E1, a second lens E2, a third lens E3, a stop STO, a fourth lens E4, a fifth lens E5, a sixth lens E6, an optical filter E7 and an imaging plane S15, which are sequentially arranged from an object side to an image side along an optical axis.

The first lens E1 has negative refractive power, an object-side surface S1 thereof is a concave surface, and an image-side surface S2 thereof is a concave surface. The second lens E2 has negative refractive power, an object-side surface S3 thereof is a convex surface, and an image-side surface S4 thereof is a concave surface. The third lens E3 has positive refractive power, an object-side surface S5 thereof is a convex surface, an image-side surface S6 thereof is a convex surface, and the third lens E3 may be made of glass. The fourth lens E4 has positive refractive power, an object-side surface S7 thereof is a convex surface, and an image-side surface S8 thereof is a convex surface. The fifth lens E5 has negative refractive power, an object-side surface S9 thereof is a concave surface, and an image-side surface S10 thereof is a convex surface. The sixth lens E6 has positive refractive power, an object-side surface S11 thereof is a convex surface, an image-side surface S12 thereof is a concave surface, and the image-side surface S12 of the sixth lens E6 has an inflection point and a critical point. The optical filter E7 has an object-side surface S13 and an image-side surface S14. Light from an object sequentially passes through the respective surfaces S1 to S14 and is finally imaged on the imaging plane S15.

Table 7 shows surface type, radius of curvature, thickness, material and conic coefficient of each lens of the optical lens group in example 3, wherein the units for the radius of curvature and the thickness are millimeter (mm).

Table 9 shows a total optical length TTL of the optical lens group, half of a diagonal length ImgH of an effective pixel area on the imaging plane S15, half of a maximal field-of-view semiFOV, a total effective focal length f of the optical lens group, and effective focal lengths f1 to f6 of respective lens in example 3.

TABLE 9

| TTL (mm) | 7.50 |
|---|---|
| ImgH (mm) | 1.84 |
| semiFOV (°) | 82.5 |
| f (mm) | 1.06 |
| f1 (mm) | −3.77 |
| f2 (mm) | −3.18 |
| f3 (mm) | 3.05 |
| f4 (mm) | 1.59 |
| f5 (mm) | −2.21 |
| f6 (mm) | 3.26 |

Figures 6A, 6B:
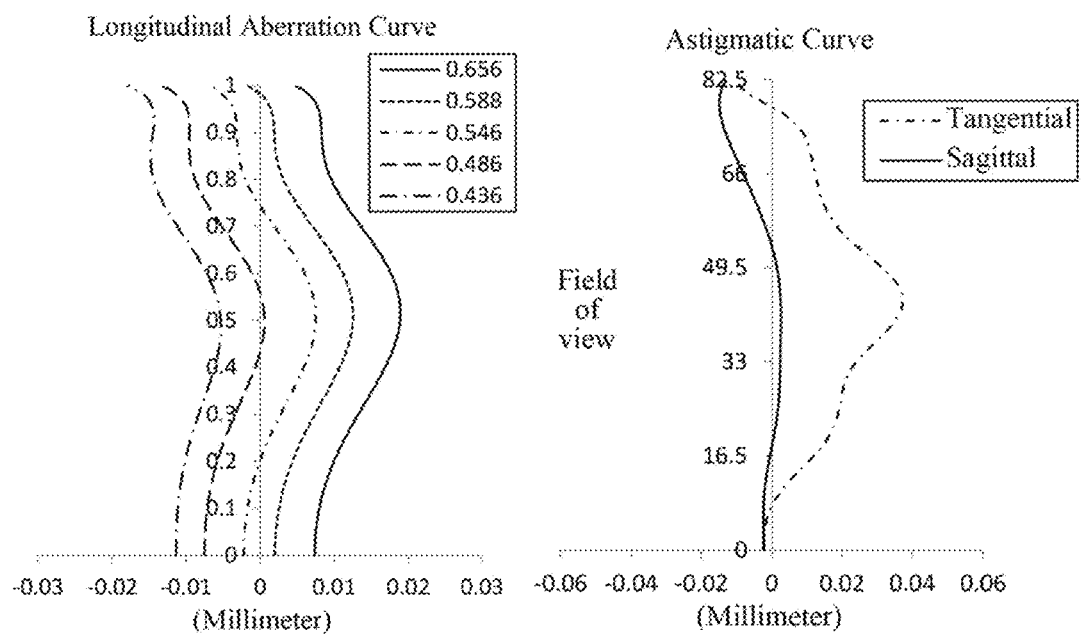
FIGS. 6A to 6C illustrate a longitudinal aberration curve, an astigmatic curve, and a lateral color curve of the optical lens group of the Example 3, respectively.
Figure 6C:
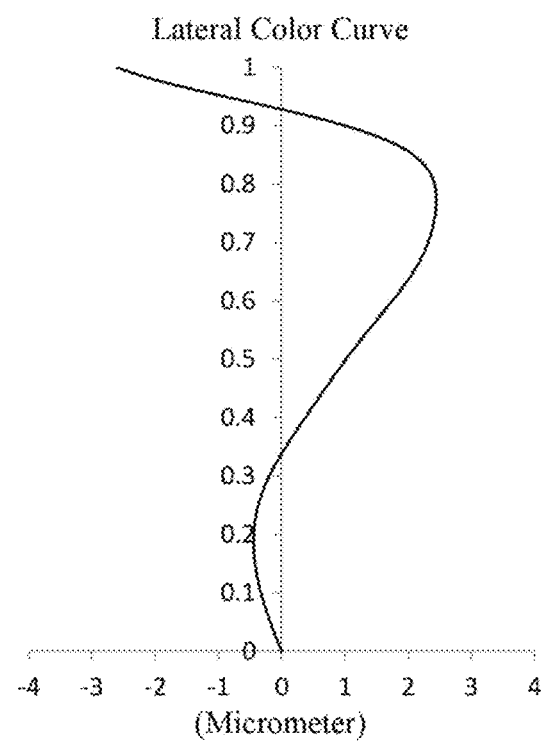

FIG. 6A illustrates a longitudinal aberration curve of the optical lens group according to example 3, representing

TABLE 7

| Surface number | Surface type | Radius of curvature | Thickness | Material Refractive index | Material Abbe number | Conic coefficient |
|---|---|---|---|---|---|---|
| OBJ | Spherical | Infinite | Infinite | | | |
| S1 | Aspheric | −3.7924 | 0.7400 | 1.55 | 56.1 | −45.9405 |
| S2 | Aspheric | 4.8278 | 0.1771 | | | −2.6222 |
| S3 | Aspheric | 1.1134 | 0.3750 | 1.55 | 56.1 | −3.0300 |
| S4 | Aspheric | 0.5977 | 0.9364 | | | −0.9454 |
| S5 | Spherical | 3.1887 | 1.7611 | 1.76 | 27.5 | |
| S6 | Spherical | −6.5141 | 0.2488 | | | |
| STO | Spherical | Infinite | 0.0300 | | | |
| S7 | Aspheric | 2.2127 | 0.7895 | 1.55 | 56.1 | −0.2814 |
| S8 | Aspheric | −1.2505 | 0.0350 | | | 0.7400 |
| S9 | Aspheric | −1.2722 | 0.2440 | 1.67 | 20.37 | 0.1516 |
| S10 | Aspheric | −9.8294 | 0.1915 | | | 95.9571 |
| S11 | Aspheric | 1.2660 | 0.9500 | 1.55 | 56.1 | −10.5048 |
| S12 | Aspheric | 3.2075 | 0.5813 | | | 2.1087 |
| S13 | Spherical | Infinite | 0.2100 | 1.52 | 64.2 | |
| S14 | Spherical | Infinite | 0.2303 | | | |
| S15 | Spherical | Infinite | | | | |

As can be seen from Table 7, in example 3, the object-side surface S5 and the image-side surface S6 of the third lens E3 are spherical. The object-side surface and the image-side surface of any one of the first lens E1, the second lens E2, the fourth lens E4, the fifth lens E5 and the sixth lens E6 are aspheric. Table 8 shows high-order coefficients applicable to each aspheric surface in example 3, wherein the surface shape of each aspheric surface may be defined by the formula (1) given in the above example 1.

deviations of focal points converged by light of different wavelengths after passing through the lens group. FIG. 6B illustrates an astigmatic curve of the optical lens group according to example 3, representing a curvature of a tangential plane and a curvature of a sagittal plane. FIG. 6C illustrates a lateral color curve of the optical lens group according to example 3, representing deviations of different image heights on an imaging plane after light passes through

TABLE 8

| Surface number | A4 | A6 | A8 | A10 | A12 | A14 | A16 |
|---|---|---|---|---|---|---|---|
| S1 | 4.1641E−03 | −3.6800E−05 | −4.9838E−06 | 2.0323E−07 | 0.0000E+00 | 0.0000E+00 | 0.0000E+00 |
| S2 | −2.8504E−02 | 2.8484E−02 | −9.6229E−03 | 1.8965E−03 | −1.2856E−04 | 0.0000E+00 | 0.0000E+00 |
| S3 | −1.4156E−02 | −7.4626E−03 | 1.0425E−03 | 3.0178E−05 | −2.9251E−06 | 0.0000E+00 | 0.0000E+00 |
| S4 | 3.4787E−02 | −2.6248E−02 | −7.3794E−02 | 3.6082E−02 | −2.3119E−03 | 0.0000E+00 | 0.0000E+00 |
| S7 | 2.4608E−02 | −7.6934E−01 | 5.8466E+00 | −2.9253E+01 | 7.8936E+01 | −1.1722E+02 | 7.1300E+01 |
| S8 | 1.7255E−01 | −2.1584E+00 | 8.9116E+00 | −2.2826E+01 | 3.5162E+01 | −2.9977E+01 | 1.0731E+01 |
| S9 | 1.7980E−02 | −4.1661E−01 | 2.2557E+00 | −5.1636E+00 | 4.8704E+00 | 5.5416E−02 | −1.4101E+00 |
| S10 | −5.1654E−01 | 2.0051E+00 | −4.5655E+00 | 7.9586E+00 | −9.3174E+00 | 6.3279E+00 | −1.8244E+00 |
| S11 | −3.6613E−02 | −1.0366E−01 | 3.0474E−01 | −4.8593E−01 | 4.4024E−01 | −2.1676E−01 | 4.4293E−02 |
| S12 | 3.8698E−02 | −1.4999E−01 | 1.2384E−01 | −6.1434E−02 | 1.7382E−02 | −2.7726E−03 | 1.871 1E−04 | the lens group. It can be seen from FIG. 6A to FIG. 6C that the optical lens group provided in example 3 may achieve good image quality.

Example 4

Figure 7:
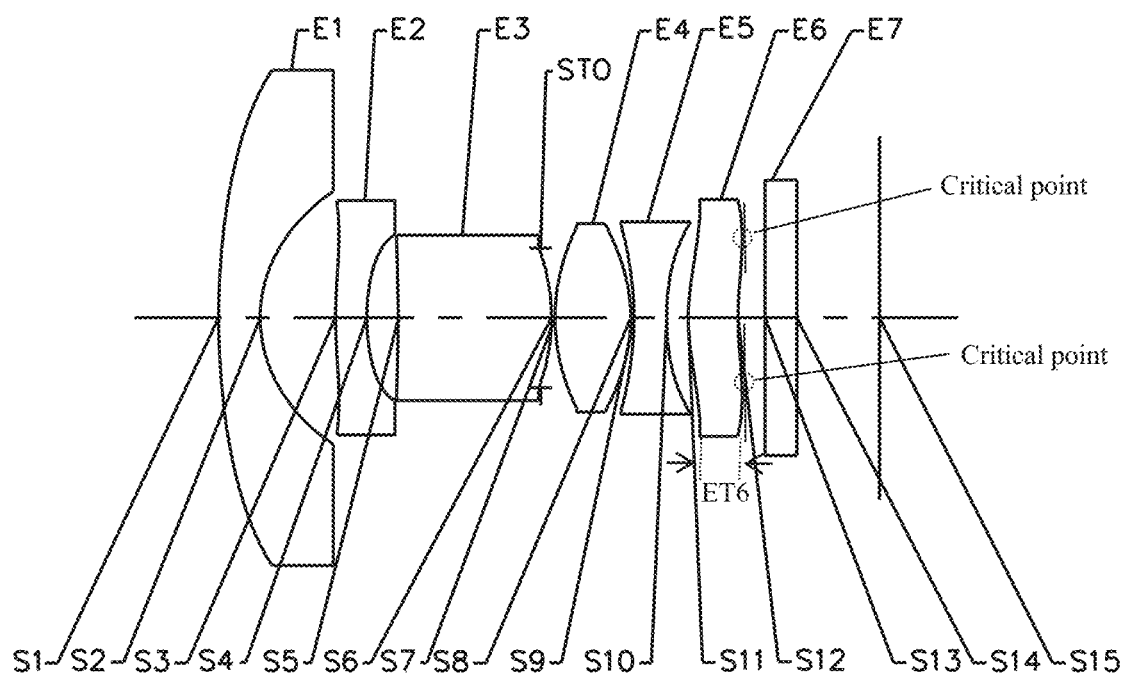
FIG. 7 illustrates a schematic structural view of an optical lens group according to Example 4 of the present disclosure.

An optical lens group according to example 4 of the present disclosure is described below with reference to FIG. 7 to FIG. 8C. FIG. 7 shows a schematic structural view of the optical lens group according to example 4 of the present disclosure.

As shown in FIG. 7, the optical lens group according to an exemplary embodiment of the present disclosure includes a first lens E1, a second lens E2, a third lens E3, a stop STO, a fourth lens E4, a fifth lens E5, a sixth lens E6, an optical filter E7 and an imaging plane S15, which are sequentially arranged from an object side to an image side along an optical axis.

The first lens E1 has negative refractive power, an object-side surface S1 thereof is a convex surface, and an image-side surface S2 thereof is a concave surface. The second lens E2 has negative refractive power, an object-side surface S3 thereof is a convex surface, and an image-side surface S4 thereof is a concave surface. The third lens E3 has positive refractive power, an object-side surface S5 thereof is a concave surface, an image-side surface S6 thereof is a convex surface, and the third lens E3 may be made of glass. The fourth lens E4 has positive refractive power, an object-side surface S7 thereof is a convex surface, and an image-side surface S8 thereof is a convex surface. The fifth lens E5 has negative refractive power, an object-side surface S9 thereof is a concave surface, and an image-side surface S10 thereof is a concave surface. The sixth lens E6 has positive refractive power, an object-side surface S11 thereof is a convex surface, an image-side surface S12 thereof is a concave surface, and the image-side surface S12 of the sixth lens E6 has an inflection point and a critical point. The optical filter E7 has an object-side surface S13 and an image-side surface S14. Light from an object sequentially passes through the respective surfaces S1 to S14 and is finally imaged on the imaging plane S15.

Table 10 shows surface type, radius of curvature, thickness, material and conic coefficient of each lens of the optical lens group in example 4, wherein the units for the radius of curvature and the thickness are millimeter (mm).

TABLE 10

| Surface number | Surface type | Radius of curvature | Thickness | Material Refractive index | Abbe number | Conic coefficient |
|---|---|---|---|---|---|---|
| OBJ | Spherical | Infinite | Infinite | | | |
| S1 | Aspheric | 5.1947 | 0.2735 | 1.54 | 55.9 | 6.9583 |
| S2 | Aspheric | 0.8764 | 0.4964 | | | −0.5518 |
| S3 | Aspheric | 2.5640 | 0.2071 | 1.55 | 56.1 | 6.7437 |
| S4 | Aspheric | 1.3513 | 0.2094 | | | 4.2689 |
| S5 | Spherical | −10.9468 | 1.0098 | 1.81 | 46.6 | |
| S6 | Spherical | −1.3288 | −0.0725 | | | |
| STO | Spherical | Infinite | 0.0945 | | | |
| S7 | Aspheric | 1.2811 | 0.4996 | 1.55 | 56.1 | −1.22E+00 |
| S8 | Aspheric | −1.1440 | 0.0220 | | | 0.2541 |
| S9 | Aspheric | −1.8536 | 0.2149 | 1.67 | 20.4 | −30.9966 |
| S10 | Aspheric | 1.8427 | 0.1422 | | | 2.3453 |
| S11 | Aspheric | 1.3189 | 0.3282 | 1.55 | 56.1 | −13.3112 |
| S12 | Aspheric | 2.0355 | 0.1786 | | | −21.3745 |
| S13 | Spherical | Infinite | 0.2100 | 1.52 | 64.2 | |
| S14 | Spherical | Infinite | 0.5449 | | | |
| S15 | Spherical | Infinite | | | | |

As can be seen from Table 10, in example 4, the object-side surface S5 and the image-side surface S6 of the third lens E3 are spherical. The object-side surface and the image-side surface of any one of the first lens E1, the second lens E2, the fourth lens E4, the fifth lens E5 and the sixth lens E6 are aspheric. Table 11 shows high-order coefficients applicable to each aspheric surface in example 4, wherein the surface shape of each aspheric surface may be defined by the formula (1) given in the above example 1.

TABLE 11

| Surface number | A4 | A6 | A8 | A10 | A12 |
|---|---|---|---|---|---|
| S1 | 0.0000E+00 | 0.0000E+00 | 0.0000E+00 | 0.0000E+00 | 0.0000E+00 |
| S2 | 6.4486E−03 | 8.5476E−02 | 0.0000E+00 | 0.0000E+00 | 0.0000E+00 |
| S3 | −5.7288E−01 | 3.8785E−01 | −3.8428E−02 | −1.8778E−01 | −4.8017E−19 |
| S4 | −2.2557E−01 | 1.3383E+00 | −2.0807E+00 | 9.3550E+00 | −2.9518E−20 |
| S7 | 3.8657E−02 | −7.6026E−02 | 4.2342E−01 | −7.2253E−01 | −3.0234E−20 |
| S8 | −8.3376E−02 | 9.5725E−01 | −1.4862E+00 | 1.0355E+00 | −2.9838E−20 |
| S9 | −1.8455E−01 | 5.7499E−01 | −2.4403E+00 | 3.2920E+00 | −2.9991E−20 |
| S10 | 3.4220E−01 | −9.3028E−03 | −1.5429E+00 | 1.9658E+00 | −2.9318E−20 |

TABLE 11-continued

| Surface number | A4 | A6 | A8 | A10 | A12 |
|---|---|---|---|---|---|
| S11 | −2.9788E−01 | 3.4869E−01 | 4.7714E−02 | −4.8604E−01 | −3.6599E−20 |
| S12 | −3.9058E−01 | 2.4138E−01 | −6.3265E−02 | −3.5567E−02 | −5.7854E−20 |

Table 12 shows a total optical length TTL of the optical lens group, half of a diagonal length ImgH of an effective pixel area on the imaging plane S15, half of a maximal field-of-view semiFOV, a total effective focal length f of the optical lens group, and effective focal lengths f1 to f6 of respective lens in example 4.

TABLE 12

| TTL (mm) | 4.36 |
|---|---|
| ImgH (mm) | 1.20 |
| semiFOV (°) | 82.5 |
| f (mm) | 0.93 |
| f1 (mm) | −2.01 |
| f2 (mm) | −5.56 |
| f3 (mm) | 1.79 |
| f4 (mm) | 1.19 |
| f5 (mm) | −1.35 |
| f6 (mm) | 5.90 |

Figure 8A:
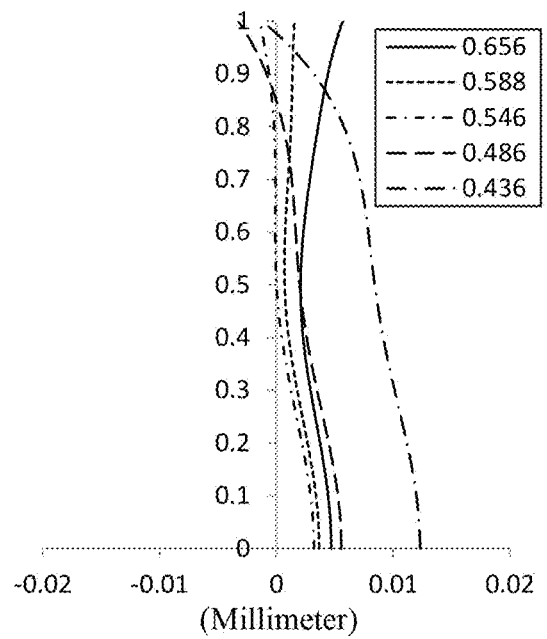
FIGS. 8A to 8C illustrate a longitudinal aberration curve, an astigmatic curve, and a lateral color curve of the optical lens group of the Example 4, respectively.
Figure 8B:
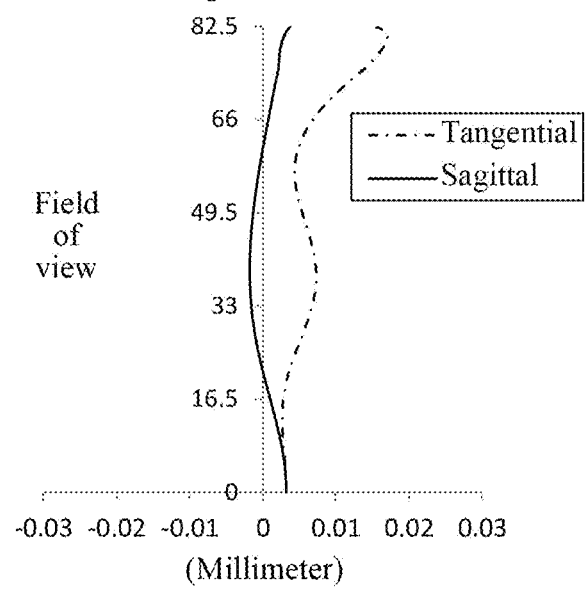
Figure 8C:
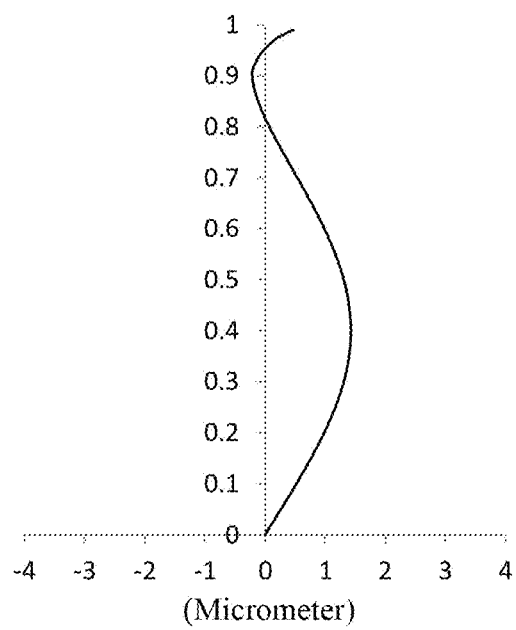

FIG. 8A illustrates a longitudinal aberration curve of the optical lens group according to example 4, representing deviations of focal points converged by light of different wavelengths after passing through the lens group. FIG. 8B illustrates an astigmatic curve of the optical lens group according to example 4, representing a curvature of a tangential plane and a curvature of a sagittal plane. FIG. 8C illustrates a lateral color curve of the optical lens group according to example 4, representing deviations of different image heights on an imaging plane after light passes through the lens group. It can be seen from FIG. 8A to FIG. 8C that the optical lens group provided in example 4 may achieve good image quality.

Example 5

An optical lens group according to example 5 of the present disclosure is described below with reference to FIG. 9 to FIG. 10C. FIG. 9 shows a schematic structural view of the optical lens group according to example 5 of the present disclosure.

As shown in FIG. 9, the optical lens group according to an exemplary embodiment of the present disclosure includes a first lens E1, a second lens E2, a third lens E3, a stop STO, a fourth lens E4, a fifth lens E5, a sixth lens E6, an optical filter E7 and an imaging plane S15, which are sequentially arranged from an object side to an image side along an optical axis.

The first lens E1 has negative refractive power, an object-side surface S1 thereof is a convex surface, and an image-side surface S2 thereof is a concave surface. The second lens E2 has negative refractive power, an object-side surface S3 thereof is a convex surface, and an image-side surface S4 thereof is a concave surface. The third lens E3 has positive refractive power, an object-side surface S5 thereof is a convex surface, an image-side surface S6 thereof is a convex surface, and the third lens E3 may be made of glass. The fourth lens E4 has positive refractive power, an object-side surface S7 thereof is a convex surface, and an image-side surface S8 thereof is a convex surface. The fifth lens E5 has negative refractive power, an object-side surface S9 thereof is a concave surface, and an image-side surface S10 thereof is a concave surface. The sixth lens E6 has positive refractive power, an object-side surface S11 thereof is a convex surface, an image-side surface S12 thereof is a concave surface, and the image-side surface S12 of the sixth lens E6 has an inflection point and a critical point. The optical filter E7 has an object-side surface S13 and an image-side surface S14. Light from an object sequentially passes through the respective surfaces S1 to S14 and is finally imaged on the imaging plane S15.

Table 13 shows surface type, radius of curvature, thickness, material and conic coefficient of each lens of the optical lens group in example 5, wherein the units for the radius of curvature and the thickness are millimeter (mm).

TABLE 13

| Surface number | Surface type | Radius of curvature | Thickness | Material Refractive index | Material Abbe number | Conic coefficient |
|---|---|---|---|---|---|---|
| OBJ | Spherical | Infinite | Infinite | | | |
| S1 | Aspheric | 15.2654 | 0.7264 | 1.54 | 55.9 | 7.8045 |
| S2 | Aspheric | 1.9652 | 1.2975 | | | −0.6647 |
| S3 | Aspheric | 7.0042 | 0.6121 | 1.55 | 56.1 | 7.2487 |
| S4 | Aspheric | 3.1076 | 0.5324 | | | 1.1837 |
| S5 | Spherical | 190.0000 | 2.4635 | 1.75 | 44.9 | |
| S6 | Spherical | −3.2329 | −0.2160 | | | |
| STO | Spherical | Infinite | 0.2787 | | | |
| S7 | Aspheric | 3.1637 | 1.4115 | 1.55 | 56.1 | −1.0207 |
| S8 | Aspheric | −2.7317 | 0.0350 | | | 0.2227 |
| S9 | Aspheric | −4.2980 | 0.4353 | 1.67 | 20.4 | −26.9354 |
| S10 | Aspheric | 4.4686 | 0.3372 | | | 1.8105 |
| S11 | Aspheric | 3.6823 | 1.1702 | 1.55 | 56.1 | −17.4029 |
| S12 | Aspheric | 6.7459 | 0.4393 | | | −22.1432 |
| S13 | Spherical | Infinite | 0.3000 | 1.52 | 64.2 | |
| S14 | Spherical | Infinite | 1.4769 | | | |
| S15 | Spherical | Infinite | | | | |

As can be seen from Table 13, in example 5, the object-side surface S5 and the image-side surface S6 of the third lens E3 are spherical. The object-side surface and the image-side surface of any one of the first lens E1, the second lens E2, the fourth lens E4, the fifth lens E5 and the sixth lens E6 are aspheric. Table 14 shows high-order coefficients applicable to each aspheric surface in example 5, wherein the surface shape of each aspheric surface may be defined by the formula (1) given in the above example 1.

TABLE 14

| Surface number | A4 | A6 | A8 | A10 | A12 |
|---|---|---|---|---|---|
| S1 | 0.0000E+00 | 0.0000E+00 | 0.0000E+00 | 0.0000E+00 | 0.0000E+00 |
| S2 | 8.4374E−04 | 9.6096E−04 | 0.0000E+00 | 0.0000E+00 | 0.0000E+00 |
| S3 | −3.9351E−02 | 4.5619E−03 | 2.3863E−05 | −5.8237E−05 | −2.2406E−22 |
| S4 | −1.1230E−02 | 1.7260E−02 | −3.8853E−03 | 2.9013E−03 | −1.5205E−24 |
| S7 | 3.2915E−03 | −6.1092E−04 | 8.5105E−04 | −3.2344E−04 | −1.5576E−24 |
| S8 | −5.8893E−03 | 1.1305E−02 | −3.0665E−03 | 1.8505E−04 | 2.2220E−22 |
| S9 | −1.3687E−02 | 4.8242E−03 | −4.6565E−03 | 9.2000E−04 | −1.5455E−24 |
| S10 | 2.2886E−02 | −6.3963E−04 | −2.8560E−03 | 6.2161E−04 | −1.5104E−24 |
| S11 | −1.5219E−02 | 4.6191E−03 | −1.6761E−04 | −1.5074E−04 | −1.8864E−24 |
| S12 | 2.9003E−03 | −1.5791E−04 | −1.1031E−05 | −2.9952E−24 | 0.0000E+00 |

Table 15 shows a total optical length TTL of the optical lens group, half of a diagonal length ImgH of an effective pixel area on the imaging plane S15, half of a maximal field-of-view semiFOV, a total effective focal length f of the optical lens group, and effective focal lengths f1 to f6 of respective lens in example 5.

TABLE 15

| | |
|---|---|
| TTL (mm) | 11.30 |
| ImgH (mm) | 3.00 |
| semiFOV (°) | 86.0 |
| f (mm) | 2.25 |
| f1 (mm) | −4.28 |
| f2 (mm) | −10.82 |
| f3 (mm) | 4.27 |
| f4 (mm) | 2.93 |
| f5 (mm) | −3.21 |
| f6 (mm) | 13.07 |

Figure 10C:
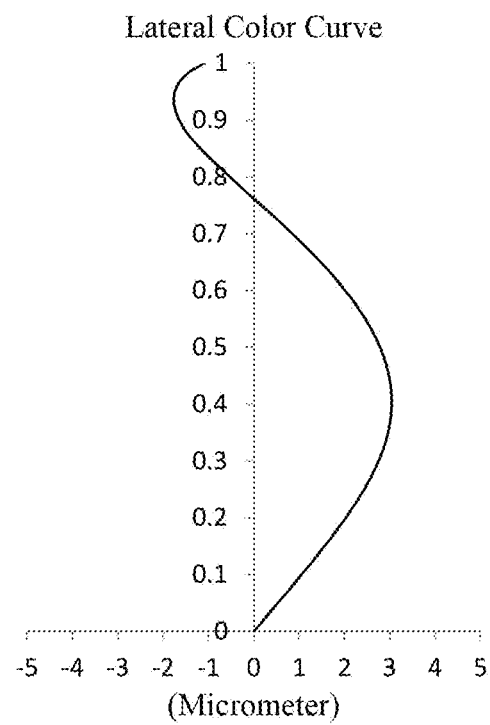

FIG. 10A illustrates a longitudinal aberration curve of the optical lens group according to example 5, representing deviations of focal points converged by light of different wavelengths after passing through the lens group. FIG. 10B illustrates an astigmatic curve of the optical lens group according to example 5, representing a curvature of a tangential plane and a curvature of a sagittal plane. FIG. 10C illustrates a lateral color curve of the optical lens group according to example 5, representing deviations of different image heights on an imaging plane after light passes through the lens group. It can be seen from FIG. 10A to FIG. 10C that the optical lens group provided in example 5 may achieve good image quality.

Example 6

Figure 11:
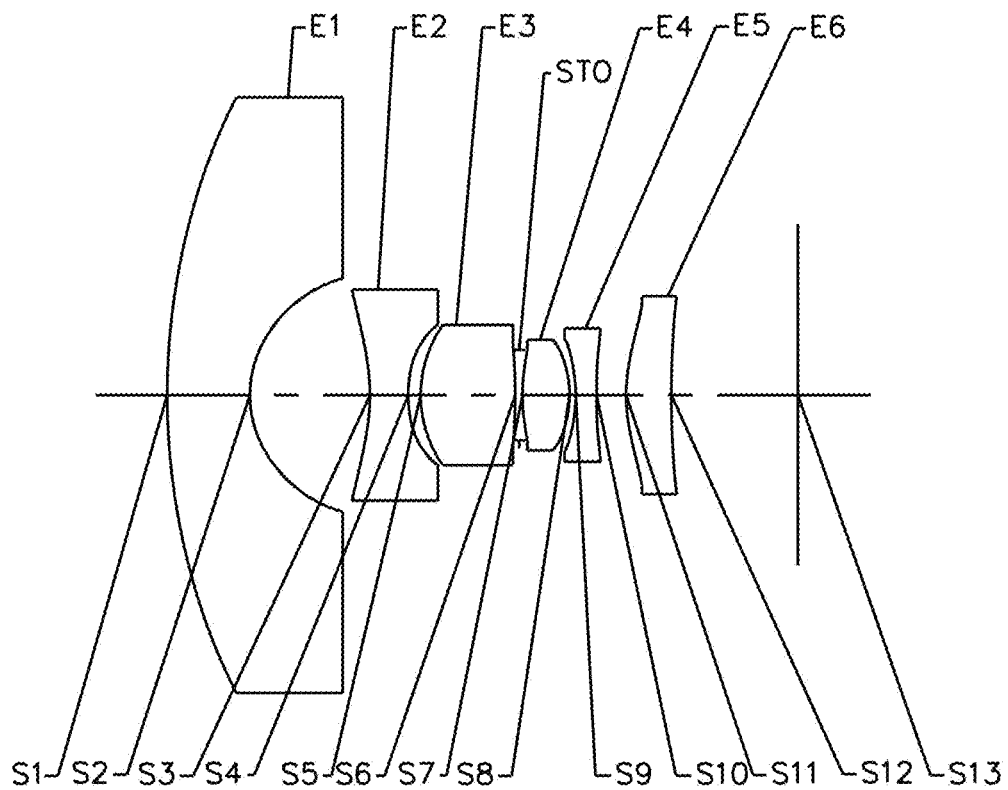
FIG. 11 illustrates a schematic structural view of an optical lens group according to Example 6 of the present disclosure.

An optical lens group according to example 6 of the present disclosure is described below with reference to FIG. 11 to FIG. 12C. FIG. 11 shows a schematic structural view of the optical lens group according to example 6 of the present disclosure.

As shown in FIG. 11, the optical lens group according to an exemplary embodiment of the present disclosure includes a first lens E1, a second lens E2, a third lens E3, a stop STO, a fourth lens E4, a fifth lens E5, a sixth lens E6 and an imaging plane S13, which are sequentially arranged from an object side to an image side along an optical axis.

The first lens E1 has negative refractive power, an object-side surface S1 thereof is a convex surface, and an image-side surface S2 thereof is a concave surface. The second lens E2 has negative refractive power, an object-side surface S3 thereof is a concave surface, and an image-side surface S4 thereof is a concave surface. The third lens E3 has positive refractive power, an object-side surface S5 thereof is a convex surface, an image-side surface S6 thereof is a convex surface, and the third lens E3 may be made of glass. The fourth lens E4 has positive refractive power, an object-side surface S7 thereof is a convex surface, and an image-side surface S8 thereof is a convex surface. The fifth lens E5 has negative refractive power, an object-side surface S9 thereof is a concave surface, and an image-side surface S10 thereof is a concave surface. The sixth lens E6 has positive refractive power, an object-side surface S11 thereof is a convex surface, and an image-side surface S12 thereof is a concave surface. Light from an object sequentially passes through the respective surfaces S1 to S12 and is finally imaged on the imaging plane S13.

Table 16 shows surface type, radius of curvature, thickness, material and conic coefficient of each lens of the optical lens group in example 6, wherein the units for the radius of curvature and the thickness are millimeter (mm).

TABLE 16

| Surface number | Surface type | Radius of curvature | Thickness | Material | | Conic coefficient |
|---|---|---|---|---|---|---|
| | | | | Refractive index | Abbe number | |
| OBJ | Spherical | Infinite | Infinite | | | |
| S1 | Aspheric | 7.9265 | 0.9691 | 1.55 | 56.1 | 0.8813 |
| S2 | Aspheric | 1.2854 | 1.4074 | | | −0.1774 |
| S3 | Aspheric | −2.2734 | 0.4484 | 1.55 | 56.1 | −11.2490 |
| S4 | Aspheric | 1.6025 | 0.1465 | | | 1.7793 |
| S5 | Spherical | 1.4340 | 1.1076 | 1.75 | 35.0 | |

TABLE 16-continued

| Surface number | Surface type | Radius of curvature | Thickness | Material Refractive index | Abbe number | Conic coefficient |
|---|---|---|---|---|---|---|
| S6 | Spherical | −6.2814 | 0.0470 | | | |
| STO | Spherical | Infinite | 0.0388 | | | |
| S7 | Aspheric | 2.2281 | 0.5515 | 1.55 | 56.1 | −0.4230 |
| S8 | Aspheric | −1.1660 | 0.0721 | | | −0.0091 |
| S9 | Aspheric | −1.5344 | 0.2440 | 1.67 | 20.4 | −1.9649 |
| S10 | Aspheric | 9.4652 | 0.3464 | | | −91.8192 |
| S11 | Aspheric | 1.8362 | 0.5314 | 1.55 | 56.1 | −21.8519 |
| S12 | Aspheric | 11.6924 | 1.4840 | | | 8.1008 |
| S13 | Spherical | Infinite | | | | |

As can be seen from Table 16, in example 6, the object-side surface S5 and the image-side surface S6 of the third lens E3 are spherical. The object-side surface and the image-side surface of any one of the first lens E1, the second lens E2, the fourth lens E4, the fifth lens E5 and the sixth lens E6 are aspheric. Table 17 shows high-order coefficients applicable to each aspheric surface in example 6, wherein the surface shape of each aspheric surface may be defined by the formula (1) given in the above example 1.

TABLE 17

| Surface number | A4 | A6 | A8 | A10 | A12 | A14 |
|---|---|---|---|---|---|---|
| S1 | −5.1180E−04 | 1.9127E−05 | 0.0000E+00 | 0.0000E+00 | 0.0000E+00 | 0.0000E+00 |
| S2 | 1.2235E−03 | −9.8278E−03 | 0.0000E+00 | 0.0000E+00 | 0.0000E+00 | 0.0000E+00 |
| S3 | 4.5198E−03 | 2.7472E−05 | 0.0000E+00 | 0.0000E+00 | 0.0000E+00 | 0.0000E+00 |
| S4 | 1.7496E−01 | −3.9243E−02 | 0.0000E+00 | 0.0000E+00 | 0.0000E+00 | 0.0000E+00 |
| S7 | 8.7315E−04 | −1.0572E+00 | 5.9127E+00 | −1.6905E+01 | 1.4503E+01 | 0.0000E+00 |
| S8 | 3.9381E−01 | −1.6635E+00 | 4.1152E+00 | −6.6907E+00 | 2.2468E+00 | 0.0000E+00 |
| S9 | 4.2454E−01 | −1.3171E+00 | 2.0226E+00 | −2.5066E+00 | 0.0000E+00 | 0.0000E+00 |
| S10 | 1.1950E−01 | −3.7646E−02 | −9.1249E−02 | −5.1741E−02 | 4.9806E−29 | 0.0000E+00 |
| S11 | 1.7216E−01 | −3.7902E−01 | 4.9725E−01 | −4.1001E−01 | 1.8106E−01 | −3.3480E−02 |
| S12 | −3.0309E−02 | 1.2582E−01 | −2.4607E−01 | 2.6178E−01 | −1.4476E−01 | 3.3125E−02 |

Table 18 shows a total optical length TTL of the optical lens group, half of a diagonal length ImgH of an effective pixel area on the imaging plane S13, half of a maximal field-of-view semiFOV, a total effective focal length f of the optical lens group, and effective focal lengths f1 to f6 of respective lens in example 6.

TABLE 18

| | |
|---|---|
| TTL (mm) | 7.39 |
| ImgH (mm) | 2.00 |
| semiFOV (°) | 82.5 |
| f (mm) | 1.22 |
| f1 (mm) | −2.96 |
| f2 (mm) | −1.65 |
| f3 (mm) | 1.65 |
| f4 (mm) | 1.49 |
| f5 (mm) | −1.96 |
| f6 (mm) | 3.91 |

FIG. 12A illustrates a longitudinal aberration curve of the optical lens group according to example 6, representing deviations of focal points converged by light of different wavelengths after passing through the lens group. FIG. 12B illustrates an astigmatic curve of the optical lens group according to example 6, representing a curvature of a tangential plane and a curvature of a sagittal plane. FIG. 12C illustrates a lateral color curve of the optical lens group according to example 6, representing deviations of different image heights on an imaging plane after light passes through the lens group. It can be seen from FIG. 12A to FIG. 12C that the optical lens group provided in example 6 may achieve good image quality.

In view of the above, examples 1 to 6 respectively satisfy the relationship shown in Table 19.

TABLE 19

| Condition | Example | | | | | |
| | 1 | 2 | 3 | 4 | 5 | 6 |
|---|---|---|---|---|---|---|
| TTL/(ImgH*TAN(semiFOV/2)) | 4.09 | 5.02 | 4.64 | 4.12 | 4.04 | 4.22 |
| f1/f3 | −1.22 | −1.05 | −1.24 | −1.12 | −1.00 | −1.80 |
| f1/f | −3.81 | −3.36 | −3.57 | −2.15 | −1.91 | −2.43 |

TABLE 19-continued

| Condition | Example | | | | | |
|---|---|---|---|---|---|---|
| | 1 | 2 | 3 | 4 | 5 | 6 |
| f1/f5 | 2.06 | 1.75 | 1.71 | 1.48 | 1.33 | 1.51 |
| N1/N3 | 0.88 | 0.88 | 0.88 | 0.86 | 0.89 | 0.89 |
| R7/R8 | −1.57 | −1.46 | −1.77 | −1.12 | −1.16 | −1.96 |
| CT3/CT4 | 1.80 | 1.73 | 2.23 | 2.02 | 1.75 | 2.01 |
| (T34 + T45)/T56 | 0.71 | 2.73 | 1.64 | 0.31 | 0.29 | 0.46 |
| ET6/CT6 | 0.96 | 0.94 | 0.97 | 0.76 | 0.85 | 0.77 |
| YC62/DT62 | 0.76 | 0.82 | 0.85 | 0.66 | 0.68 | NA |
| SAG12*10/TD | 1.86 | 1.77 | 1.09 | 1.40 | 1.34 | 1.84 |
| DT62/ImgH | 0.82 | 0.80 | 0.82 | 0.65 | 0.64 | 0.58 |

The present disclosure further provides an imaging apparatus, having an electronic photosensitive element which may be a photosensitive Charge-Coupled Device (CCD) or a Complementary Metal-Oxide Semiconductor (CMOS). The imaging apparatus may be an independent imaging device such as a digital camera, or may be an imaging module integrated in a mobile electronic device such as a mobile phone. The imaging apparatus is equipped with the optical lens group described above.

The foregoing is only a description of the preferred examples of the present disclosure and the applied technical principles. It should be appreciated by those skilled in the art that the inventive scope of the present disclosure is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present disclosure with (but not limited to), technical features with similar functions.

What is claimed is:

1. An optical lens group, comprising: a first lens, a second lens, a third lens, a fourth lens, a fifth lens and a sixth lens, which are sequentially arranged from an object side to an image side of the optical lens group along an optical axis, wherein,
the first lens has negative refractive power;
the second lens has refractive power and a concave image-side surface;
the third lens has refractive power and a convex image-side surface;
the fourth lens has positive refractive power, and a convex object-side surface;
the fifth lens has negative refractive power; and
the sixth lens has refractive power,
wherein the third lens is made of glass, and
wherein 1.5<CT3/CT4<2.5, where CT3 is a center thickness of the third lens along the optical axis, and CT4 is a center thickness of the fourth lens along the optical axis;
wherein 0.6<ET6/CT6<1,
where ET6 is an edge thickness of the sixth lens in a direction parallel to the optical axis, and CT6 is a center thickness of the sixth lens along the optical axis; and
wherein an image-side surface of the sixth lens has an inflection point and a critical point, and 0.5<YC62/DT62<1,
where YC62 is a vertical distance from the critical point of the image-side surface of the sixth lens to the optical axis, and DT62 is an effective half-aperture of the image-side surface of the sixth lens, wherein the critical point of the image-side surface of the sixth lens refers to a point, except for an intersection point with the optical axis, on the image-side surface of the sixth lens that is tangent to a tangent plane perpendicular to the optical axis.

2. The optical lens group according to claim 1, wherein N1/N3<0.9,
where N1 is a refractive index of the first lens, and N3 is a refractive index of the third lens.

3. The optical lens group according to claim 1, wherein the third lens has positive refractive power, and −2<f1/f3≤−1,
where f1 is an effective focal length of the first lens, and f3 is an effective focal length of the third lens.

4. The optical lens group according to claim 1, wherein −4<f1/f<−1.8,
where f1 is an effective focal length of the first lens, and f is a total effective focal length of the optical lens group.

5. The optical lens group according to claim 1, wherein 1.3<f1/f5<2.1,
where f1 is an effective focal length of the first lens, and f5 is an effective focal length of the fifth lens.

6. The optical lens group according to claim 1, wherein −2<R7/R8<−1,
where R7 is a radius of curvature of the object-side surface of the fourth lens, and R8 is a radius of curvature of an image-side surface of the fourth lens.

7. The optical lens group according to claim 1, wherein (T34+T45)/T56<3,
where T34 is a spaced interval between the third lens and the fourth lens along the optical axis, T45 is a spaced interval between the fourth lens and the fifth lens along the optical axis, and T56 is a spaced interval between the fifth lens and the sixth lens along the optical axis.

8. The optical lens group according to claim 1, wherein 1<SAG12*10/TD<2,
where SAG12 is a distance along the optical axis from an intersection of an image-side surface of the first lens and the optical axis to a vertex of a maximum effective half-aperture of the image-side surface of the first lens, and TD is a spaced interval between an object-side surface of the first lens and an image-side surface of the sixth lens along the optical axis.

9. The optical lens group according to claim 1, wherein 0.5<DT62/ImgH<1,
where DT62 is an effective half-aperture of an image-side surface of the sixth lens, and ImgH is half of a diagonal length of an effective pixel area on an imaging plane of the optical lens group.

10. The optical lens group according to claim 1, wherein TTL/(ImgH*tan(semiFOV/2))<6, where TTL is a distance along the optical axis from an object-side surface of the first lens to an imaging plane of the optical lens group, ImgH is half of a diagonal length of an effective pixel area on the imaging plane of the optical lens group, and semiFOV is half of a maximal field-of-view of the optical lens group.

11. An optical lens group, comprising: a first lens, a second lens, a third lens, a fourth lens, a fifth lens and a sixth lens, which are sequentially arranged from an object side to an image side of the optical lens group along an optical axis, wherein,
the first lens has negative refractive power;
the second lens has refractive power, a convex object-side surface, and a concave image-side surface;
the third lens has refractive power and a convex image-side surface;
the fourth lens has positive refractive power, and a convex object-side surface;
the fifth lens has negative refractive power; and
the sixth lens has refractive power,
wherein the third lens is made of glass, and
wherein an image-side surface of the sixth lens has an inflection point and a critical point, and $0.5<YC62/DT62<1$, where YC62 is a vertical distance from the critical point to the optical axis, and DT62 is an effective half-aperture of the image-side surface of the sixth lens, wherein the critical point of the image-side surface of the sixth lens refers to a point, except for an intersection point with the optical axis, on the image-side surface of the sixth lens that is tangent to a tangent plane perpendicular to the optical axis;
wherein $0.6<ET6/CT6<1$,
where ET6 is an edge thickness of the sixth lens, and CT6 is a center thickness of the sixth lens along the optical axis; and wherein $1.3<f1/f5<1.75$,
where f1 is an effective focal length of the first lens, and f5 is an effective focal length of the fifth lens.

12. The optical lens group according to claim 11, wherein the third lens has positive refractive power, and $-2<f1/f3\leq-1$,
where f1 is an effective focal length of the first lens, and f3 is an effective focal length of the third lens.

13. The optical lens group according to claim 11, wherein $-4<f1/f<-1.8$,
where f1 is an effective focal length of the first lens, and f is a total effective focal length of the optical lens group.

14. The optical lens group according to claim 11, wherein $1<SAG12*10/TD<2$,
where SAG12 is a distance along the optical axis from an intersection of an image-side surface of the first lens and the optical axis to a vertex of a maximum effective half-aperture of the image-side surface of the first lens, and TD is a spaced interval between an object-side surface of the first lens and the image-side surface of the sixth lens along the optical axis.

15. The optical lens group according to claim 11, wherein $0.5<DT62/ImgH<1$,
where DT62 is an effective half-aperture of the image-side surface of the sixth lens, and ImgH is half of a diagonal length of an effective pixel area on an imaging plane of the optical lens group.

16. The optical lens group according to claim 11, wherein $TTL/(ImgH*tan(semiFOV/2))<6$,
where TTL is a distance along the optical axis from an object-side surface of the first lens to an imaging plane of the optical lens group, ImgH is half of a diagonal length of an effective pixel area on the imaging plane of the optical lens group, and semiFOV is half of a maximal field-of-view of the optical lens group.

* * * * *